US012167096B2

(12) United States Patent
Tashiro

(10) Patent No.: US 12,167,096 B2
(45) Date of Patent: Dec. 10, 2024

(54) SERVERS AND METHODS

(71) Applicant: 17LIVE Japan Inc., Tokyo (JP)

(72) Inventor: Nagisa Tashiro, Tokyo (JP)

(73) Assignee: 17LIVE JAPAN INC., Tokyo (JP)

( * ) Notice: Subject to any disclaimer, the term of this patent is extended or adjusted under 35 U.S.C. 154(b) by 0 days.

(21) Appl. No.: 17/983,985

(22) Filed: Nov. 9, 2022

(65) Prior Publication Data

US 2023/0276101 A1 Aug. 31, 2023

(30) Foreign Application Priority Data

Feb. 25, 2022 (JP) ................................. 2022-027946

(51) Int. Cl.
*H04N 21/4784* (2011.01)
*H04N 21/2187* (2011.01)
*H04N 21/442* (2011.01)

(52) U.S. Cl.
CPC ..... *H04N 21/4784* (2013.01); *H04N 21/2187* (2013.01); *H04N 21/44204* (2013.01)

(58) Field of Classification Search
None
See application file for complete search history.

(56) References Cited

U.S. PATENT DOCUMENTS

| 11,172,258 | B1 * | 11/2021 | Tamersoy | ............... | G06F 18/22 |
| 2017/0180798 | A1 * | 6/2017 | Goli | ................... | H04N 21/2407 |
| 2021/0279759 | A1 * | 9/2021 | Lee | .................... | G06Q 30/0235 |
| 2022/0021939 | A1 * | 1/2022 | Mizuta | ............. | H04N 21/25866 |
| 2022/0337918 | A1 * | 10/2022 | Shibata | .................. | G06Q 50/01 |
| 2023/0071173 | A1 * | 3/2023 | Chen | .................. | H04N 21/4784 |
| 2023/0319325 | A1 * | 10/2023 | Zhong | ............. | H04N 21/41407 |
| | | | | | 725/37 |

FOREIGN PATENT DOCUMENTS

WO 2020/202860 A1 10/2020

OTHER PUBLICATIONS

Rule for Army—17LIVE, 1 pg. URL: https://17.live/en-US/army/about.
Notice of Reasons for Refusal dated May 31, 2022, issued in corresponding Japanese Patent Application No. 2022-027946 with English translation (11 pgs.).
"About the item", with English translation (17 pgs.) URL: https://note.com/himarin25/n/n2633e9600205.

* cited by examiner

*Primary Examiner* — Jason K Lin
(74) *Attorney, Agent, or Firm* — Pillsbury Winthrop Shaw Pittman, LLP

(57) ABSTRACT

A server includes a means for receiving, from a terminal via a network, a start request that includes information relating to a first gift specified on the terminal and information relating to a target streamer, a means for starting a period during which a second gift that is different from the first gift can be used during a livestreaming of the target streamer upon receiving the start request, a means for storing a parameter that is updated each time the second gift is used, and a means for enabling distribution of an electronic value associated with the first gift to a viewer when distribution conditions are satisfied. The distribution conditions include a viewed time condition relating to a viewed time during which the livestreaming of the target streamer is viewed by viewers, and a parameter condition relating to the parameter.

8 Claims, 29 Drawing Sheets

| Stream ID | Streamer ID | Viewer ID |
|---|---|---|
| ST22 | 001A | SS5, SS12, SS43 |
| ST92 | 002B | TT3, TS2 |

| User ID | Army ID |
|---|---|
| A001 | SS20, SS59 |
| B002 | KK1 |

| User ID | Points | Follower ID | Following ID |
|---|---|---|---|
| 001A | 3243 | | ABCFO, KKKOK, XX@EEEX |
| ABCFO | 2510 | 001A, XX@EEEX | |
| XX@EEEX | 1803 | 001A | ABCFO |
| KKKOK | 1305 | 001A | |

| Gift ID | Awarded Points | Equivalet Value Points | Gift Type |
|---|---|---|---|
| TT01 | 90 | 100 | Normal |
| TE01 | 180 | 200 | Normal |
| SPA | 0 | 100 | Rewards |
| SPB | 0 | 1000 | Rewards |
| SPC | 0 | 10000 | Rewards |
| QQ1 | 0 | 10 | Deposit |
| QQ2 | 0 | 50 | Deposit |
| QQ3 | 0 | 100 | Deposit |

| Target Streamer ID | Rewards Gift ID | Start Time | Total Viewed Time | Viewing Time of Each Viewer | Accum. Points | Depositer ID | Deposit-ers | Frequency |
|---|---|---|---|---|---|---|---|---|
| ABCFO | SPB | 2022/2/20 9:55 | 3.8 hr | 001A:0.5hr, XX@EEEX:0.8hr | 700 | 001A, XX@EEEX | 2 | 1 |
| KKKOK | SPC | 2022/1/30 16:30 | 36 hr | 001A: 2hr, ⋯ | 8500 | 001A, ⋯ | 25 | 2 |

| Rewards Gift ID | Reference Value of Total Viewed Time | Reference Value of Accumulated Points | Reference Value of Number of Depositors | Reference Value of Streaming Frequency |
|---|---|---|---|---|
| SPA | 10hr | 200 | NA | NA |
| SPB | 30hr | 1000 | 10 | NA |
| SPC | 100hr | 10000 | 30 | 3 |

| Rewards Gift ID | Reference Value of Viewing Time | Deposit | Reference Value of Consecutive Views | Reference Value of Number of Comments |
| --- | --- | --- | --- | --- |
| SPA | 15min | Required | Not Required | NA |
| SPB | 30min | Required | Not Required | NA |
| SPC | 1hr | Required | 3 Times | 10 |

| Gift ID | Awarded Points | Equivalet Value Points | Gift Type |
|---|---|---|---|
| TT01 | 90 | 100 | Normal |
| TE01 | 180 | 200 | Normal |
| JKPA | 0 | 100 | Rewards |
| JKPB | 0 | 1000 | Rewards |
| JKBC | 0 | 10000 | Rewards |
| TICKETA | 0 | 10 | Lottery |
| TICKETB | 0 | 100 | Lottery |
| TICKETC | 0 | 1000 | Lottery |

| Target Streamer ID | Rewards Gift ID | Start Time | Viewing Time of Each Viewer | Accumulated Points | Number Of Lotteries For Each Viewer |
|---|---|---|---|---|---|
| ABCFO | JKPB | 2022/2/20 9:55 | 001A:0.5hr, XX@EEEX:0.8hr | 1400 | 001A:1, XX@EEEX:3 |
| KKKOK | JKPC | 2022/1/30 16:30 | 001A: 2hr, ⋯ | 16000 | 001A:2, ⋯ |

| Rewards Gift ID | Winning Probability Formula |
|---|---|
| JKPA | Viewing Time x P |
| JKPB | Viewing Time x R + Number Of Lotteries x S |
| JKPC | Viewing Time x T + Number Of Lotteries x U + Number Of Comments x V |

| Lottery Gift ID | Use Time | Viewer ID | Target Streamer ID | Accumulated Viewing Time |
|---|---|---|---|---|
| TICKETB | 2022/2/20 13:55 | 001A | ABCFO | 7 Minutes |

SERVERS AND METHODS

CROSS-REFERENCE TO RELATED APPLICATIONS

This application is based on and claims the benefit of priority from Japanese Patent Application Serial No. 2022-27946 (filed on Feb. 25, 2022), the contents of which are hereby incorporated by reference in its entirety.

TECHNICAL FIELD

The present disclosure relates to a server and a method.

BACKGROUND ART

Modes of the information exchange have evolved with the advancement of information technology. During the Showa era, newspapers and television were the primary means of one-way information transmission. Widespread of cell phones and personal computers, and significant improvement in internet communication speed in the Heisei era gave rise to real-time bidirectional communication services such as chat services, and popularized on-demand video streaming services as a result of lowered the storage costs. At present, in the Reiwa era, as smartphones have become more advanced and network speed characterized by 5G continue to improve, services that offer real-time video communication, particularly livestreaming services, are quickly gaining popularity. The number of livestreaming users is increasing, and is especially popular among young people as a service that allows everyone to share the good times even when they are far away from each other.

Giving a reward to viewers who satisfy certain conditions is one of the methods to enhance the livestreaming. For example, "About the Items, Himari, URL:https://note.com/himarin25/n/n2633e9600205" (the Non-Patent Literature) discloses that the more a viewer gives a lucky gift during a livestreaming, the more the bar gauge increases, and a reward is given to the viewer when a certain amount is exceeded. The Non-Patent Literature also discloses a gambling gift in which a viewer wins a lottery ticket by giving a lucky gift, and one viewer is drawn every hour to win a diamond from the ticket.

[Non-Patent Document 1] [Streamer Army], 17LIVE URL: https://helpfeel.com/17media-jp/% E3%83% A9% E3%82% A4% E3%83%90% E3%83% BC % E3%82% A2% E3%83% BC % E3%83%9F % E3%83% BC-5d1b19ed60a44d0017857bf6

[Non-Patent Document 2] [About the Items], Himari, URL: https://note.com/himarin25/n/n2633e9600205

SUMMARY

According to a method as described in the Non-Patent Literature, a viewer is motivated to give gifts. Therefore, an increase in the gift usage can be expected. However, such a method does not motivate the viewer to watch a streamer's livestreaming more often or for a longer period of time. It is difficult to strengthen a positive relationship between the streamer and the viewer by only promoting gambling. A new method of livestreaming is required for further enriching connections between people.

The present disclosure was made in light of these problems. An object of the present disclosure is to provide a livestreaming technology capable of further enriching connections between people.

Certain aspects of the present disclosure relate to a server. Such a server includes a means for receiving from a terminal via a network a start request that includes information relating to a first gift specified on the terminal and information relating to a target streamer, a means for starting a time period during which a second gift that is different from the first gift can be used during a livestreaming of the target streamer upon receiving the start request, a means for storing a parameter that is updated each time the second gift is used, and a means for enabling distribution of an electronic value associated with the first gift to a viewer when distribution conditions that include a viewed time condition relating to a viewed time during which the livestreaming of the target streamer is viewed by the viewer, and a parameter condition relating to the parameter are satisfied.

Another aspect of the present invention also relates to the server. Such a server includes a means for receiving from a terminal via a network a start request that includes information relating to a first gift specified on the terminal and information relating to a target streamer, a means for starting a time period upon receiving the start request, and a means for enabling distribution of an electronic value associated with the first gift to a viewer when distribution conditions that include a viewed time condition relating to a viewed time during which the livestreaming of the target streamer is viewed by the viewer are satisfied during that time period.

Any combination of the above components, or mutual substitution of the components and expressions of the invention among devices, methods, systems, computer programs, recording media containing computer programs, and the like, is also valid as an aspect of the present invention.

The present invention can provide a livestreaming technology capable of enriching connections between people.

BRIEF DESCRIPTION OF THE DRAWINGS

FIG. 4 is a data structure diagram showing an example of a stream DB shown in FIG. 3.

FIG. 5 is a data structure diagram showing an example of an army DB shown in FIG. 3.

FIG. 6 is a data structure diagram showing an example of a user DB shown in FIG. 3.

FIG. 7 is a data structure diagram showing an example of a gift DB shown in FIG. 3.

FIG. 8 is a data structure diagram showing an example of a rewards gift DB shown in FIG. 3.

FIG. 9 is a data structure diagram showing an example of a distribution condition DB shown in FIG. 3.

FIG. 10 is a data structure diagram showing an example of a receiving condition DB shown in FIG. 3.

FIG. 23 is a data structure diagram showing an example of a gift DB shown in FIG. 22.

FIG. 24 is a data structure diagram showing an example of a rewards gift DB shown in FIG. 22.

FIG. 25 is a data structure diagram showing an example of a winning probability DB shown in FIG. 22.

FIG. 26 is a data structure diagram showing an example of a lottery history DB shown in FIG. 22.

DESCRIPTION OF THE EMBODIMENTS

Identical or equivalent components, members, processes, and signals shown in each drawing shall have the same symbols in the following explanation, and redundant explanation thereof will be omitted wherever appropriate. Moreover, in each drawing, a part of the components that are not important for the explanation are omitted.

First Embodiment

A livestreaming system according to a first embodiment introduces a rewards gift as a new type of a gift. When the rewards gift is used by a streamer or a viewer in a livestreaming session, the rewards gift period starts, and a deposit target object is placed on the room screen of the corresponding livestreaming. The viewer deposits (or "accumulates") points to the deposit target object by using a dedicated deposit gift. When the viewed time, which is the duration of the livestreaming of a streamer in which the deposit target object was placed was viewed by the viewers exceeds a reference value and the accumulated points reach a reference value, the accumulated points are distributed or rewarded to the viewer who satisfies a predetermined receiving condition.

Because the accumulated points include points corresponding to the equivalent value of the rewards gift, the points rewarded to the viewer are usually more than the points deposited by the viewer. Therefore, more viewers are attracted to the livestreaming in which the deposit target object is placed. Moreover, because the viewed time of the streamer is a condition for opening the deposit target object, the viewer is motivated to watch the livestreaming of the streamer for a longer period of time. Accordingly, an opportunity can be created for a streamer to promote themselves, or for a viewer to promote streamers, and discovery of new streamers can be facilitated. As a result, for example, an opportunity can be provided for new and mid-career streamers to become more noteworthy.

Moreover, by using the rewards gift in the livestreaming of their "favorite" streamer, the viewer can attract more viewers to the streamer's livestreaming in exchange for a payment by themselves, and can feel a sense of accomplishment in supporting their "favorite" streamer.

Figure 1:
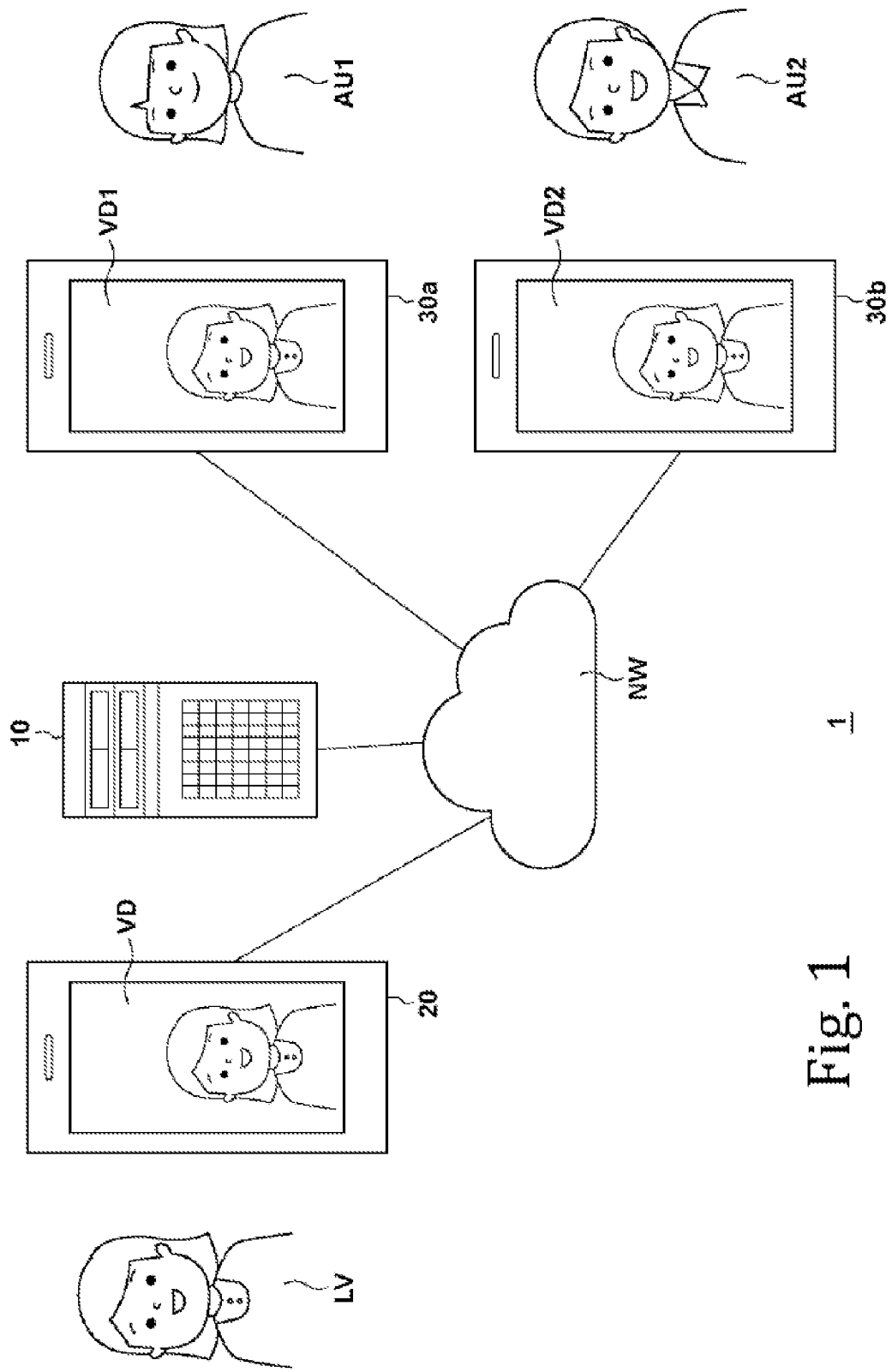
FIG. 1 is a schematic diagram of a livestreaming system according to a first embodiment.

FIG. 1 is a schematic diagram of a livestreaming system 1 according to a first embodiment. The livestreaming system 1 provides an interactive livestreaming service that enables real-time interaction between a streamer LV (also referred to as liver) and a viewer (also called audience) AU (AU1, AU2, . . . ) in real time. As shown in FIG. 1, the livestreaming system 1 includes a server 10, a streamer-side user terminal 20, and a viewer-side user terminal 30 (30a, 30b, . . . ). The streamer and the viewer are sometimes collectively referred to as users. The server 10 can include one or a plurality of information processing devices connected to a network NW. The user terminals 20 and 30 can be portable terminals such as smartphones, tablet terminals, laptop PCs, recorders, portable game consoles, wearable devices, and the like, or can be stationary devices such as desktop PCs. The server 10, the user terminal 20, and the user terminal 30 are connected to each other by various wired or wireless networks NW so as to be able to communicate with each other.

The streamer LV, the viewer AU, and a not-shown administrator who manages the server 10 participate in the livestreaming system 1. The streamer LV is a person who transmits content in real time by recording or video-taping his/her own songs, talks, performances, fortune-telling, live games, and other content with his or her own user terminal 20 and uploading the same directly to the server 10. The administrator provides a platform for livestreaming the content on the server 10, and mediates or manages the real-time interaction between the streamer LV and the viewer AU. The viewer AU accesses the platform at the user terminal 30, and selects and views a desired content. During the livestreaming of such a content, the viewer AU performs operations to comment and cheer by using the user terminal 30, the streamer LV who provides the content responds to the comments and cheers, and the responses by the streamer LV are transmitted to the viewer AU via video and/or audio, thereby establishing a two-way communication.

The "livestreaming" explained in the present specification can be referred to as a mode of data transmission that realizes a state in which content recorded/video-taped at the user terminal 20 of the streamer LV can be played and viewed at the user terminal 30 of the viewer AU in substantially real time, or can be referred to as the streaming itself realized by such a mode of transmission. The livestreaming can be realized by using the existing livestreaming technologies such as HTTP Live Streaming, Common Media Application Format, Web Real-Time Communications, Real Time Messaging Protocol, MPEG DASH, and the like. The livestreaming includes a mode of transmission in which the streamer LV is recording/video-taping content and the viewer AU is able to view that content with a predetermined delay. Concerning an extent of the delay, at least a delay long enough to set up an exchange between the viewer AU and the streamer LV is permitted. However, the livestreaming is distinguished from a so-called on-demand streaming, in which the entire data with recorded or video-taped content is stored on a server, and the server provides the stored data to users at their request at any subsequent time.

The "video data" explained in the specification is a data that includes image data generated by the image capture function of the user terminals 20 and 30 and audio data generated by the sound input function of the user terminals 20 and 30. The video data is played on the user terminals 20 and 30 to enable viewing of the content by the user. In the present embodiment, it is assumed that between the time the video data is generated at the user terminal of the streamer and the time that video data is played at the user terminal of the viewer, processes are performed to change the format, size, and specifications of the data, such as compression, decompression, encoding, decoding, and transcoding. Because the content represented by the video data (for example, video and audio) before and after such processing is performed does not substantially change, the present practice assumes that the video data after the processing is the same as the video data before the processing. In other words, when the video data is generated at the user terminal of the streamer and then played on the user terminal of the viewer via the server 10, the video data generated at the streamer's user terminal, the video data passing through the server 10, and the video data received and played on the user terminal of the viewer are all the same.

In the example shown in FIG. 1, the streamer LV is livestreaming the talk. The user terminal 20 of the streamer LV generates a video data by recording and video-taping the images and sound of the streamer LV conducting the talk, and transmits the video data to the server 10 via the network NW. At the same time, the user terminal 20 displays a video VD of the streamer LV on a display section of the user terminal 20 to enable confirmation of the streaming content by the streamer LV.

The user terminals 30a and 30b of viewers AU1 and AU2 who have requested the platform to view the livestreaming of the streamer LV, respectively, receive the video data pertaining to the livestreaming via the network NW, and outputs plays videos VD1 and VD2 on the display section and outputs audio from speakers by playing the received video data. The videos VD1 and VD2 displayed on each of the user terminals 30a and 30b are substantially the same as the videos VD captured by the user terminal 20 of the streamer LV, and the audio output on each of the user terminals 30a and 30b is substantially the same as the audio recorded by the user terminal 20 of the streamer LV.

The recording/video-taping performed on the user terminal 20 of the streamer LV and the playback of the video data on the user terminals 30a and 30b of the viewers AU1 and AU2 are performed substantially at the same time. When one viewer AU1 inputs a comment on the user terminal 30a about the content of the streamer LV's talk, the server 10 displays the comment on the user terminal 20 of the streamer LV in real time, and on the user terminals 30a and 30b of viewers AU1 and AU2, respectively. When the streamer LV reads the comment and develops a talk that covers the content of the comment, the video and audio of the talk are output on the user terminals 30a and 30b of the viewer AU1 and AU2, respectively. Accordingly, it can be recognized that a conversation has been established between the streamer LV and the viewer AU1. In such a manner, the livestreaming system 1 realizes a livestreaming that allows not one way, but two-way communication.

Figure 2:
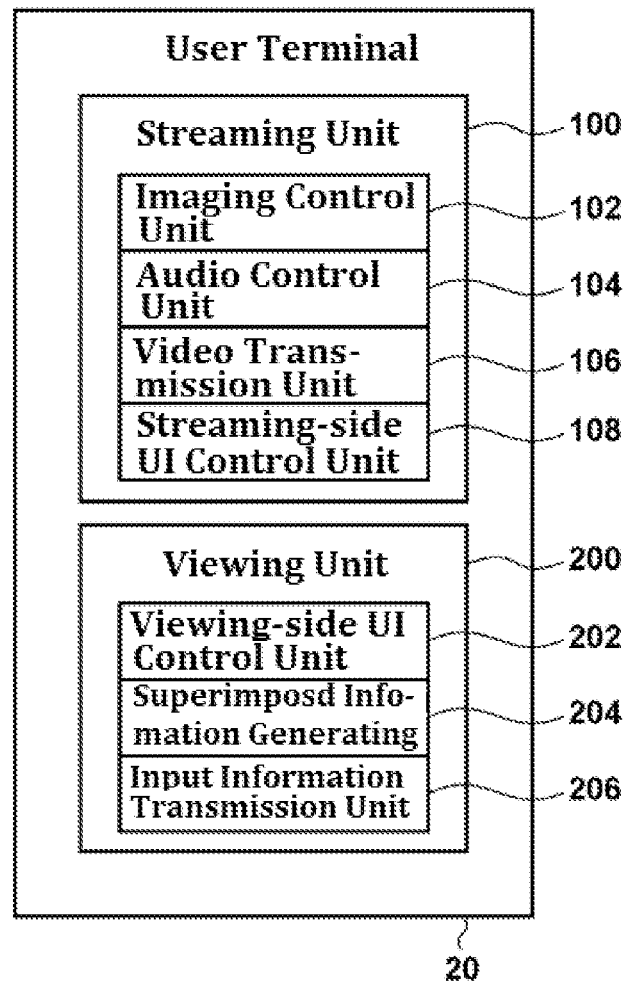
FIG. 2 is a block diagram of functions and configuration of the user terminal shown in FIG. 1.

FIG. 2 is a block diagram of functions and configuration of the user terminal 20 shown in FIG. 1. The user terminal 30 has the same functions and configuration as that of the user terminal 20. Each of the blocks shown in FIG. 3 and subsequent block diagrams can be realized, hardware-wise, by a CPU of a computer CPU and other elements or mechanical devices, and software-wise, by a computer program and the like. The functional blocks explained in the present specification realized by linking such hardware and software elements. Therefore, a person skilled in the art who is familiar with the present specification can understand that these functional blocks can be realized in various ways by a combination of hardware and software elements.

The streamer LV and the viewer AU download and install a livestreaming application program according to the present embodiment (hereinafter referred to as the "livestreaming application") on the user terminals 20 and 30 from the downloading site via the network NW. Alternatively, the livestreaming application can be pre-installed on the user terminals 20 and 30. When the livestreaming application is executed by the user terminals 20 and 30, the user terminals 20 and 30 communicate with the server 10 via the network NW to realize various functions. The functions realized by (processors such as CPUs of) the user terminals 20 and 30 that execute the livestreaming application are explained below as the functions of the user terminals 20 and 30. Basically, the livestreaming application makes the user terminals 20 and 30 realize those functions. However, in other embodiments, these functions can be realized by a computer program written in a programming language such as HTML (HyperText Markup Language) that is transmitted from the server 10 to the web browsers of user terminals 20 and 30 via the network NW and executed by a web browser.

The user terminal 20 includes a streaming unit 100 that generates the video data with recorded images and sound of the user and provides it to the server 10, and a viewing unit 200 that acquires and plays the video data from the server 10. The user activates the streaming unit 100 for streaming and the viewing unit 200 for viewing, respectively. The user terminal with the activated streaming unit 100 is the streamer-side user terminal, that is, the user terminal that generates the video data, and the user terminal with activated viewing unit 200 is the viewer-side user terminal, that is, the user terminal that plays the video data.

The streaming unit 100 includes an imaging control unit 102, an audio control unit 104, a video transmission unit 106, and a streaming-side UI control unit 108. The imaging control unit 102 is connected to a camera (not shown in FIG. 2), and controls imaging performed by the camera. The imaging control unit 102 obtains an image data from the camera. The audio control unit 104 is connected to a microphone (not shown in FIG. 2) and controls an audio input through the microphone. The audio control unit 104 acquires an audio data from the microphone. The video transmission unit 106 transmits to the server 10 via the network NW the video data that includes the image data acquired by the imaging control unit 102 and the audio data acquired by the audio control unit 104. The video transmission unit 106 transmits the video data in real time. In other words, generation of the video data by the imaging control unit 102 and the audio control unit 104 and transmission of the generated video data by the video transmission unit 106 are performed substantially at the same time. The streaming-side UI control unit 108 controls the UI for the streamer. The streaming-side UI control unit 108 is connected to the display section (not shown in FIG. 2), and displays the video on the display section by playing the video data to be transmitted by the video transmission unit 106. The streaming-side UI control unit 108 displays an object for operation and an object for instruction receiving on the display section and receives tap input by the streamer.

The viewing unit 200 includes a viewing-side UI control unit 202, a superimposed information generating unit 204, and an input information transmission unit 206. The viewing unit 200 receives the video data relating to the livestreaming from the server 10 via the network NW. The viewing-side UI control unit 202 controls the UI for the viewer. The viewing-side UI control unit 202 is connected to the display section and a speaker (not shown in FIG. 2), and plays the received video data to display the video on the display section and output the audio through the speaker. When an image is output to the display section and a sound is output from the speaker, it can be said that the "video data playback" is being performed. The viewing-side UI control unit 202 is connected to an input means such as a touch panel, a keyboard, and a display section (not shown in FIG. 2), and acquires a user input via such an input means. The superimposed information generating unit 204 superimposes a predetermined frame image on the video data image acquired from the server 10. The frame image includes various user interface objects (simply referred to as an object in the present specification) for receiving input from the user, comments entered by the viewer, and information acquired from the server 10. The input information transmission unit 206 transmits the user input acquired by the viewing-side UI control unit 202 to the server 10 via the network NW.

Figure 3:
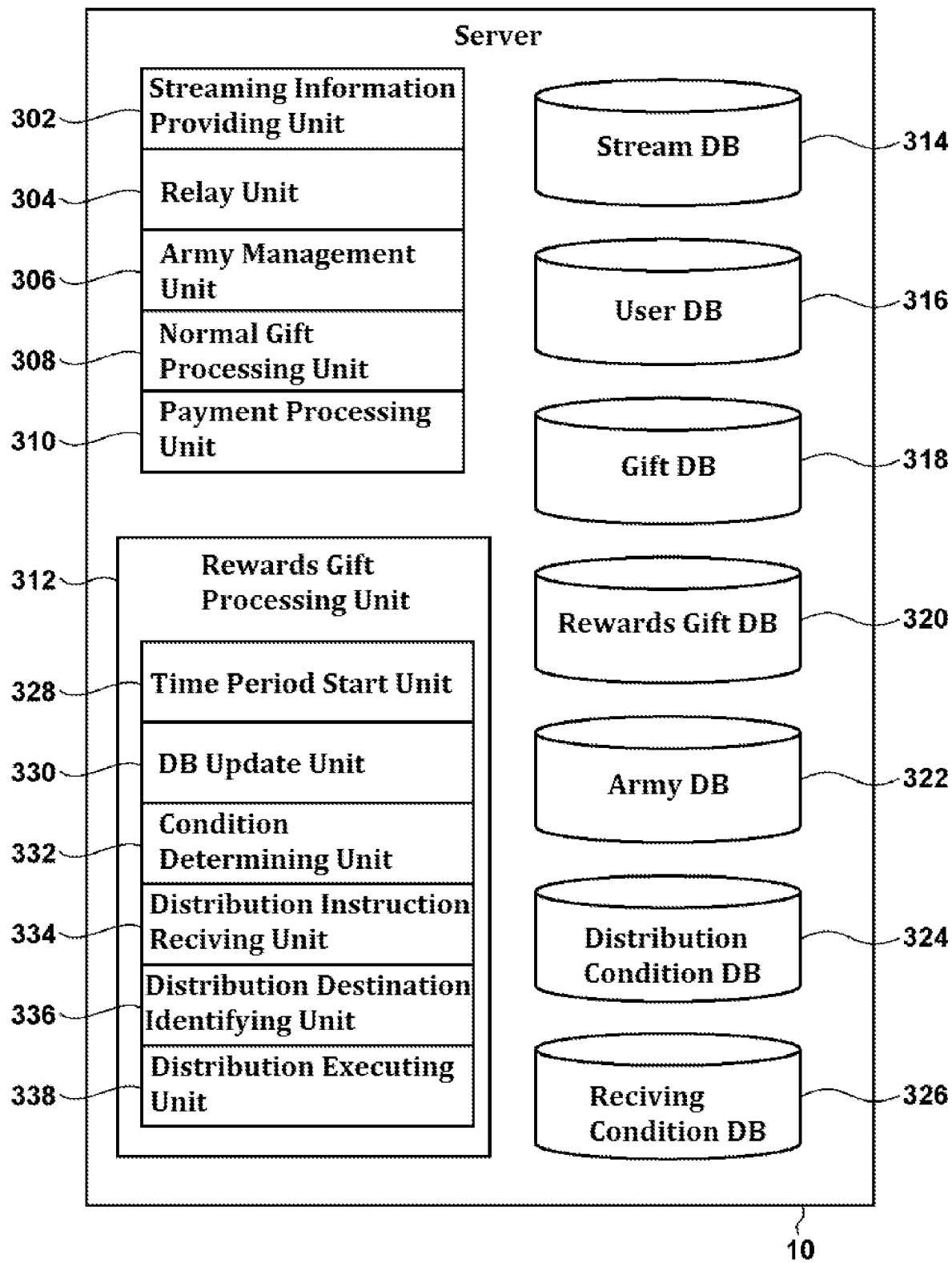
FIG. 3 is a block diagram of functions and configuration of a server shown in FIG. 1.

FIG. 3 is a block diagram of functions and configuration of the server 10 shown in FIG. 1. The server 10 includes a streaming information providing unit 302, a relay unit 304, an army management unit 306, a normal gift processing unit 308, a payment processing unit 310, a rewards gift processing unit 312, a stream DB 314, a user DB 316, a gift DB 318, a rewards gift DB 320, an army DB 322, a distribution condition DB 324, and receiving condition DB 326.

FIG. 4 is a data structure diagram showing an example of the stream DB 314 shown in FIG. 3. The stream DB 314 maintains information on the on-going livestreaming. The stream DB 314 maintains information by associating a stream ID that identifies livestreaming on the livestreaming platform provided by the livestreaming system 1, a streamer ID which is a user ID that identifies the streamer of the corresponding livestreaming, and a viewer ID which is a user ID that identifies the viewer of the livestreaming. In the livestreaming platform provided by the livestreaming system 1 according to the present embodiment, a user becomes a streamer when he/she performs a livestreaming, and becomes a viewer when he/she watches a livestreaming performed by another user. Therefore, the distinction between a streamer and a viewer is not fixed; and a user ID registered as a streamer ID at one time can be registered as a viewer ID at another time.

FIG. 5 is a data structure diagram showing an example of the army DB 322 shown in FIG. 3. The army DB 322 maintains information on fan armies of various streamers. The army DB 322 maintains information by associating a user ID of the user and an army ID which is the user ID of a user who is the army of the corresponding user. An army of a user (hereinafter referred to as "marshal user") is a user who subscribes to a subscription service of a marshal user, and can be said to be a member of the fan club of that marshal user. When the user is a member of the army, the user must pay a predetermined registration fee to the administrator on a regular basis (monthly or quarterly). The administrator grants at least a portion of that registration fee to the marshal user. If the viewer is in the army of the marshal user, he/she will receive a special gift, a special entry animation, and other benefits when watching a livestreaming in which the marshal user is the streamer. Concerning the army, such a function can be realized by using the technology disclosed in Non-Patent Document 1.

FIG. 6 is a data structure diagram showing an example of the user DB 316 shown in FIG. 3. The user DB 316 maintains information relating to users. The user DB 316 maintains information by associating the user ID that identifies the user, points held by the user, a follower ID which is the user ID of other users who are following the user; and a followee ID which is the user ID of another user that the user is following. A point is an electronic value that is circulated within the livestreaming platform. When the streamer receives a gift from a viewer during a livestreaming, the points held by the streamer increase by the value corresponding to the gift. The points can be used, for example, to determine the amount of the reward or money the streamer receives from the administrator of the livestreaming platform.

FIG. 7 is a data structure diagram showing an example of the gift DB 318 shown in FIG. 3. The gift DB 318 maintains information on gifts that can be used by the viewer in the livestreaming. A gift is an electronic data with the following characteristics:

Points or money of an equivalent value that can be purchased, or awarded free of charge;

A gift that the viewer can give to the streamer. Giving a gift to the streamer is also referred to as using a gift or offering a gift.

Sometimes a viewer purchases and uses a gift at the same time, while sometimes it can be purchased and then used at any point of time.

Usually, when a viewer gives a gift to the streamer, the streamer is awarded the appropriate points. There are also types of gifts in which points are awarded to the viewer rather than to the streamer, such as the rewards gift and the deposit gift according to the present embodiment.

Using a gift can produce the effects associated with the gift. For example, effects corresponding to the gift appear on the livestreaming screen.

The gift DB 318 maintains information by associating the gift ID that identifies the gift; the awarded points which are the points awarded to the corresponding streamer when the gift is given to the streamer; the equivalent value points as the equivalent value payable for using the gift, and a gift type. The viewer can give the gift to the streamer by paying the equivalent value points for a desired gift while watching the livestreaming. The payment of such equivalent value points can be made by an appropriate electronic means, for example, the viewer can pay the equivalent value points to the administrator. Alternatively, bank transfers or credit card payments can also be used. The relationship between awarded points and equivalent value points can be set arbitrarily by the administrator. For example, it may be set to "awarded points=equivalent value points". Alternatively, the points obtained by multiplying the awarded points by a predetermined factor such as 1.2 may be set as the equivalent value points, or the points obtained by adding predetermined commission points to the awarded points may be set as the equivalent value points.

The gift types include normal, rewards, and deposit. A normal gift is a gift that, when used, subtracts equivalent value points from the giving viewer's points and adds the awarded points to the receiving streamer's points. A rewards gift is a gift that, when used, subtracts equivalent value points from the points of the user (viewer or streamer) who used it, and initiates a rewards gift period for the target streamer. The deposit gift is a gift that can only be used during the rewards gift period of the corresponding rewards gift, and when used, subtracts equivalent value points from the giving viewer's points and adds the equivalent value points to the accumulated points for the corresponding rewards gift period. As per the example shown in FIG. 7, the rewards gift "SPA" is associated with three deposit gifts "QQ1", "QQ2", and "QQ3". The rewards gift "SPB" is associated with three deposit gifts "QQ1", "QQ2", and "QQ3". The rewards gift "SPC" is associated with three deposit gifts "QQ1", "QQ2", and "QQ3".

FIG. 8 is a data structure diagram showing an example of the rewards gift DB 320 shown in FIG. 3. The rewards gift DB 320 maintains information about used rewards gifts. As long as the streamer is registered in the rewards gift DB 320, the streamer becomes a streamer within the rewards gift period. Therefore, when the rewards gift used for a certain streamer is registered in the rewards gift DB 320, the rewards gift period for that streamer is initiated. The rewards gift DB 320 maintains information by associating a target streamer ID which is the user ID of the target streamer, a rewards gift ID of the used rewards gift, a start time of the rewards gift period, the total viewed time of all viewers who watched the live stream of the target streamer during the rewards gift period, the viewing time for each viewer during the rewards gift period, accumulated points that is updated or increased each time a deposit gift is used in the target streamer's livestreaming, a depositor ID which is the user ID of the viewer who used the deposit gift in the target streamer's livestreaming, a number of depositors which is the number of viewers who used the deposit gift in the target streamer's livestreaming, and the streaming frequency which is the number of livestreaming performed by the target streamer during the rewards gift period. The rewards gift DB 320 can further maintain the number of consecutive views and the number of comments by each viewer in the rewards gift period.

The "viewing time" explained in the present specification is a parameter associated with a viewer—streamer pair, and refers to the amount of time (view duration) the viewer has watched the livestreaming of the corresponding streamer. The "viewed time" explained in the present specification is a parameter associated with a streamer, and refers to the time (viewed duration) the livestreaming of the corresponding streamer is viewed by viewers. The viewer in this case can be a randomly selected single viewer, a subset of randomly selected viewers, or all viewers. Alternatively, the viewed time can be an average value calculated across viewers. The viewed time is an indicator of an extent to which the streamer's livestreaming is viewed by the viewers. The "total viewed time" explained in the present specification is a form of viewed time, which is the time obtained by adding up the viewing time for all viewers who viewed the target streamer's livestreaming during the rewards gift period.

For example, when a rewards gift is given during the streamer A's livestreaming and the streamer A enters a rewards gift period, the viewer B watches the streamer A's livestreaming for 2 hours, the viewer C watches it for 3 hours, and the viewer D watches it for 4 hours during the rewards gift period, the total viewed time will be calculated as follows:

Viewer B's viewing time=2 hours
Viewer C's viewing time=3 hours
Viewer D's viewing time=4 hours
Total viewed time of the streamer A's livestreaming=2+3+4=9 hours
Average viewed time of the livestreaming of the streamer A=9/3=3 hours
The time can be calculated as a ratio "viewed time of the streamer A's livestreaming:total viewed time", or can be the average viewed time.

FIG. 9 is a data structure diagram showing an example of the distribution condition DB 324 shown in FIG. 3. The distribution condition DB 324 maintains the distribution conditions that must be satisfied to enable the rewarding or distribution of points to the viewer as indicated by the accumulated points during the rewards gift period. The distribution conditions include at least one of the following: a condition related to the viewed time, a condition related to the accumulated points, a condition related to the number of depositors, and a condition related to the streaming frequency. The distribution condition DB 324 maintains information by associating the rewards gift ID of the rewards gift to which the distribution condition is applied, the reference value of the total viewed time, the reference value of the accumulated points, the reference value of the depositors, and the reference value of the streaming frequency. Each of the reference values is a lower limit or threshold that the corresponding parameter must reach or exceed so as to satisfy the distribution condition. The distribution condition DB 324 is configured so that the administrator can set the contents accordingly.

In the example shown in FIG. 9, to enable the distribution of the rewards gift identified by the rewards gift ID "SPA" to the viewer, it is indicated that all of the following must be satisfied: (1) the total viewed time must exceed 10 hours, and (2) the accumulated points must reach 200 points. To enable the distribution of the rewards gift identified by the rewards gift ID "SPC" to the viewer, it is indicated that all of the following must be satisfied: (1) the total viewed time must exceed 100 hours; (2) the accumulated points must reach 5000 points; (3) the number of depositors must reach 30 depositors, and (4) the streaming frequency during the rewards gift period must be at least 3 livestreams. Because, for the rewards gift ID "SPC", the larger the corresponding equivalent value points, the larger the total viewed time and accumulated points required, it is not assumed that those conditions will be fulfilled in a single stream, and it is assumed that the streamer will perform multiple streams during the rewards gift period. In other words, the viewer-inducing effect of this rewards gift persists across the multiple streams.

FIG. 10 is a data structure diagram showing an example of the receiving condition DB 326 shown in FIG. 3. The receiving condition DB 326 maintains the receiving conditions that must be satisfied by the viewer to be eligible for rewarding or distribution of points as indicated by the points accumulated during the rewards gift period. The receiving conditions include at least one of the following: a condition relating to the viewing time, a condition relating to whether a deposit gift is used, a condition relating to the number of consecutive views, and a condition relating to the number of comments. The receiving condition DB 326 maintains information by associating the rewards gift ID of the rewards gift to which the receiving condition applies, the reference value of the viewing time, the necessity for using the deposit item, the reference value of the number of consecutive views, and the reference value of the number of comments. Each reference value is the lower limit or threshold that the corresponding parameter must reach or exceed so as to satisfy the receiving condition. The receiving condition DB 326 is configured so that the administrator can set the contents accordingly. The number of consecutive views is the number of times the viewer has watched the livestreaming in a row when the target streamer performed the multiple livestreams during the rewards gift period. The number of comments is the number of comments entered by the viewers on the target streamer's livestreaming during the rewards gift period. For example, when the target streamer conducts three livestreams during the rewards gift period, the viewer A watches the first and second live streams, and enters three and five comments, respectively, the number of consecutive views and comments for the corresponding viewer will be two and eight, respectively. Moreover, for example, if the target streamer performs three livestreaming during the rewards gift period and the viewer A watches the first livestreaming and the third livestreaming, the number of consecutive views for that viewer will be one. In the present example, the number of comments is the value added up throughout the livestreaming; however, in other embodiments, an average or representative value can be used.

As per the example shown in FIG. 10, to be eligible for receiving distribution of the rewards gift identified by the rewards gift ID "SPA," all of the following must be satisfied: (1) the viewing time must exceed 15 minutes, and (2) the deposit gift must be used. To be eligible for receiving distribution of the rewards gift identified by the rewards gift ID "SPC," it is indicated that all of the following must be satisfied: (1) the viewing time must exceed 1 hour; (2) the deposit gift must be used; (3) 3 or more consecutive views during the deposit gift period, and (4) the number of comments must be 10 or more.

In FIG. 3, the army management unit 306 handles the processes relating to the army management, such as registering and deregistering the armies, periodically paying the equivalent value points to armies, and granting special effects to armies. For example, upon receiving an application from a viewer's user terminal 30 for becoming an army of a specific streamer, the army management unit 306 updates the army DB 322 such that the viewer's user ID is added to the army ID corresponding to that specific streamer's user ID.

Upon receiving a notification of starting a livestreaming from the streamer's user terminal 20 via the network NW, the streaming information providing unit 302 registers the stream ID that identifies the livestreaming and the streamer ID of the streamer of the livestreaming in the stream DB 314. Upon receiving a request for providing information on livestreams from the viewing unit 200 of the viewer's user terminal 30 via the network NW, the streaming information providing unit 302 generates a list of livestreams currently available for viewing by referring to the stream DB 314. For each livestreaming included in the generated list, the streaming information providing unit 302 refers to the rewards gift DB 320 to determine whether the livestreaming is performed by the streamer who is within the rewards gift period. The streaming information providing unit 302 adds to the list a flag that indicates the result of the determination, that is, whether each livestreaming is performed by a streamer who is within the rewards gift period. The streaming information providing unit 302 sends the generated list to the requesting user terminal 30 via the network NW. The viewing-side UI control unit 202 of the requesting user terminal 30 generates a livestreaming selection screen based on the received list and displays it on the display section of the user terminal 30.

Upon receiving the viewer's selection of a livestreaming on the livestreaming selection screen, the input information transmission unit 206 of the user terminal 30 generates a streaming request that includes the stream ID of the selected livestreaming, and transmits the same to the server 10 via the network NW. The streaming information providing unit 302 starts providing to the requesting user terminal 30 the livestreaming specified by the stream ID included in the received streaming request. The streaming information providing unit 302 updates the stream DB 314 so that the viewer ID of the corresponding stream ID includes the user ID of the viewer of the requesting user terminal 30.

The relay unit 304 relays the transmission of the video data from the streamer's user terminal 20 to the viewer's user terminal 30 in the livestreaming initiated by the streaming information providing unit 302. The relay unit 304 receives from the input information transmission unit 206 a signal that indicates the user input by the viewer during playback of the video data. The signal that indicates the user input can be a gift specifying signal that indicates the specification of a gift object on the display section of the user terminal 30. The gift specifying signal includes the viewer ID of the viewer who gave the gift, the streamer ID of the streamer who is the recipient of the gift (=streamer ID of the streamer whose livestreaming is being viewed by the viewer who gave the gift), and the gift ID of the gift corresponding to the specified gift object. Similarly, the relay unit 304 receives a signal that indicates the user input by the streamer during playback of the video data, for example, the gift specifying signal from the streaming unit 100 of the user terminal 20. In such a case, the gift specifying signal includes the streamer ID of the streamer and the gift ID of the gift corresponding to the specified gift object.

The relay unit 304 refers to the gift DB 318 to identify the gift type of the gift identified by the gift ID included in the received gift specifying signal. If the gift type identified for the gift specifying signal received from viewer's user terminal 30 is a rewards gift, the relay unit 304 receives the gift specifying signal as a rewards gift period start request that includes the gift ID of the rewards gift specified in the user terminal 30 and the streamer ID of the target streamer. When the gift type identified for the gift specifying signal received from streamer's user terminal 20 is a rewards gift, the relay unit 304 receives the gift specifying signal as the rewards gift period start request that includes the gift ID of the rewards gift specified in the user terminal 20 and the streamer ID of the target streamer.

The normal gift processing unit 308 updates the user DB 316 so that when the gift identified by the gift ID included in the gift specifying signal is a normal gift, the streamer's points are increased in accordance with the awarded points for the corresponding normal gift. The normal gift processing unit 308 refers to the gift DB 318, and identifies the awarded points corresponding to the gift ID included in the received gift specifying signal. The normal gift processing unit 308 updates the user DB 316 so as to add the identified awarded points to the points corresponding to the user ID included in the gift specifying signal.

A payment processing unit 310 processes the payment of the equivalent value of the gift by the viewer or streamer in response to receipt of the gift specifying signal. The payment processing unit 310 performs the same payment processing for the normal gift, the rewards gift, and the deposit gift. The payment processing unit 310 refers to the gift DB 318 and identifies the equivalent value points for the gift identified by the gift ID included in the gift specifying signal. When the gift specifying signal is sent from the user terminal 30 of the viewer, the payment processing unit 310 updates the user DB 316 such that the equivalent value points are deducted from the points of the viewer identified by the viewer ID included in the gift specifying signal. When the gift specifying signal is sent from the user terminal 20 of the streamer, the payment processing unit 310 updates the user DB 316 such that the equivalent value points are deducted from the points of the streamer identified by the streamer ID included in the gift specifying signal.

The rewards gift processing unit 312 updates the rewards gift DB 320 when the gift identified by the gift ID included in the gift specifying signal is the rewards gift or the deposit gift. Upon receiving the rewards gift period start request, the rewards gift processing unit 312 starts the rewards gift period to enable the use of the deposit gift that is different from the rewards gift in the livestreaming of the target streamer. When the distribution condition maintained in the distribution condition DB 324 is satisfied, the rewards gift processing unit 312 enables the distribution of the accumulated points associated with the rewards gift to the viewer. The rewards gift processing unit 312 includes a time period start unit 328, a DB update unit 330, a condition determining unit 332, a distribution instruction receiving unit 334, a distribution destination identifying unit 336, and a distribution executing unit 338.

The time period start unit 328 starts the rewards gift period by registering a new entry to the rewards gift DB 320 when the gift identified by the gift ID included in the gift specifying signal is the rewards gift. The time period start unit 328 registers the streamer ID, the gift ID of the rewards gift, the time at which the rewards gift is used on the user terminal, and the default value of the accumulated points included in the gift specifying signal to the target streamer ID, rewards gift ID, start time, and accumulated points of the rewards gift DB 320. The time period start unit 328 calculates the default value of the accumulated points based on the equivalent value points of the rewards gift. The default value of the accumulated points can be calculated by a formula that can be arbitrarily set by the administrator. For example, the default value can be set to a value obtained by multiplying the equivalent value points of the rewards gift with a constant smaller than 1 such as 0.8. Alternatively, the equivalent value points of the rewards gift can also be set as the default value.

The DB update unit 330 updates the entry corresponding to the rewards gift DB 320 when the gift identified by the gift ID included in the gift specifying signal is the deposit gift. In the rewards gift DB 320, the DB update unit 330 adds the equivalent value points of the deposit gift identified by the gift ID included in the gift specifying signal to the accumulated points of the entry in which the streamer ID included in the gift specifying signal is the target streamer ID. When the viewer ID included in the gift specifying signal is not registered to the depositor ID of the entry, the DB update unit 330 registers the viewer ID to the depositor ID and adds and increases the number of depositors for the entry by 1.

The DB update unit 330 identifies the livestreaming streamed by the streamer identified by the target streamer ID registered in the rewards gift DB 320 by referring to the rewards gift DB 320 and the stream DB 314 at periodic or fixed time intervals. The DB update unit 330 measures the viewing time of the viewers for each of the identified livestreams and updates the viewing time of each viewer for the corresponding entry in the rewards gift DB 320. The DB update unit 330 updates the total viewed time for the corresponding entry based on the updated viewing time of each viewer. The DB update unit 330 updates the streaming frequency of the corresponding entry in the rewards gift DB 320.

For example, when the target streamer finishes a first livestreaming during the rewards gift time, it is assumed that the total viewed time is two hours, the viewing time of the viewer A is one hour, and the viewing time of the viewer B is one hour. It is assumed that the target streamer started a second livestreaming during the rewards gift time, and the viewer B viewed that livestreaming for 0.5 hour whereas the viewer C viewed that livestreaming for 0.3 hour. In such a case, the DB update unit 330 monitors the second livestreaming, and measures the viewing time of the viewer B and the viewer C as 0.5 hour and 0.3 hour, respectively. The DB update unit 330 updates "Viewer A: 1 hour, Viewer B: 1 hour" recorded in an entry corresponding to the rewards gift DB 320 to "Viewer A: 1 hour, Viewer B: 1.5 hours, Viewer C: 0.3 hour", updates the total viewed time of the entry from "2 hours" to "2.8 hours", and updates the streaming frequency in the entry from "1" to "2".

The condition determining unit 332 determines whether a corresponding distribution condition registered in the distribution condition DB 324 is satisfied for each entry in the rewards gift DB 320. The condition determining unit 332 refers to the distribution condition DB 324, and acquires a reference value of the total viewed time, a reference value of accumulated points, a reference value of number of depositors (if any), and a reference value of streaming frequency (if any) corresponding to the rewards gift ID of the entry in the rewards gift DB 320. The condition determining unit 332 compares the total viewed time of the entry in the rewards gift DB 320 with the acquired reference value of the total viewed time, and determines whether a viewed time condition is satisfied. When the total viewed time exceeds the reference value, it is determined that the viewed time condition is satisfied. The condition determining unit 332 compares the accumulated points of the entry in the rewards gift DB 320 with the reference value of the acquired accumulated points, and determines whether an accumulated points condition is satisfied. When the accumulated points reach the reference value, it is determined that the accumulated points condition is satisfied. The condition determining unit 332 compares the number of depositors of the entry in the rewards gift DB 320 with the acquired reference value of the number of depositors, and determines whether the number of depositors condition is satisfied. When the number of depositors exceeds the reference value, it is determined that the number of depositors condition is satisfied. The condition determining unit 332 compares the streaming frequency of the entry in the rewards gift DB 320 with the acquired reference value of the streaming frequency, and determines whether the streaming frequency condition is satisfied. When the streaming frequency is greater than or equal to the reference value, it is determined that the streaming frequency condition is satisfied. When the viewed time condition and the accumulated points condition are satisfied, the number of depositors condition is satisfied when the reference value for the number of depositors is acquired, and the streaming frequency condition is satisfied when the reference value of the streaming frequency is acquired for the entry of the rewards gift DB 320, the condition determining unit 332 determines that the distribution condition is satisfied for that entry.

When it is determined in the condition determining unit 332 that the distribution condition is satisfied, the distribution instruction receiving unit 334 starts waiting for the distribution start instruction. The distribution instruction receiving unit 334 sends a request for distribution start instruction to the user terminal 20 of the target streamer via the network. The distribution instruction receiving unit 334 receives the distribution start instruction from the user terminal 20 via the network.

When the distribution instruction receiving unit 334 receives the distribution start instruction regarding the rewards gift that satisfies the distribution condition, the distribution destination identifying unit 336 identifies a viewer who satisfies the corresponding receiving condition registered in the receiving condition DB 326 among the viewers of the livestreaming of the target streamer as a distribution destination viewer for distributing the accumulated points associated with the rewards gift. The distribution destination identifying unit 336 refers to the receiving condition DB 326, and acquires a reference value of a viewing time corresponding to the rewards gift ID of the entry in the rewards gift DB 320 that is determined to satisfy the distribution condition, necessity of using the deposit gift, a reference value of number of consecutive views (if any), and a reference value of number of comments (if any). The distribution destination identifying unit 336 performs the following determination for each viewer that is registered under "viewing time of viewers" of the entry in the rewards gift DB 320.

(1) The distribution destination identifying unit 336 compares the viewing time of the viewer recorded in the entry of the rewards gift DB 320 with the acquired reference value of the viewing time, and determines whether the viewing time condition is satisfied. When the viewing time exceeds the reference value, it is determined that the viewing time condition is satisfied.

(2) When it is necessary to use the deposit gift, the distribution destination identifying unit 336 determines whether the use condition is satisfied by determining whether the viewer ID of the viewer is registered in the depositor ID. When the viewer ID is registered, it is determined that the condition for using the deposit gift is satisfied. This use condition is satisfied when the viewer uses the deposit gift in the livestreaming of the target streamer during the rewards gift period.

(3) The distribution destination identifying unit 336 compares the number of consecutive views by the viewer recorded in the entry in the rewards gift DB 320 with the acquired reference value for the consecutive views, and determines whether the number of consecutive views condition is satisfied. When the number of consecutive views is greater than or equal to the reference value, it is determined that the number of consecutive views condition is satisfied.

(4) The distribution destination identifying unit 336 compares the number of comments by the viewer recorded in the entry in the rewards gift DB 320 with the acquired reference value for the comments, and determines whether the number of comments condition is satisfied. If the number of comments is greater than or equal to the reference value, it is determined that the number of comments condition is satisfied.

When the viewing time condition is satisfied, the use condition is satisfied when the use of the deposit gift is necessitated, the reference value of the number of consecutive views is acquired and the consecutive views condition is satisfied, the reference value of the number of comments is acquired and the number of comments condition is satisfied for each viewer, the distribution destination identifying unit 336 identifies such a viewer as the distribution destination viewer.

When the distribution instruction receiving unit 334 receives the distribution start instruction for the rewards gift that satisfies the distribution condition and the distribution destination identifying unit 336 identifies the viewer to whom the distribution is to be made, the distribution executing unit 338 performs processing for distributing the accumulated points associated with the rewards gift to the identified viewer. The distribution executing unit 338 determines the points to be distributed. For example, the distribution executing unit 338 determines the points accumulated at the time when the distribution condition is satisfied as points to be distributed. The points to be distributed determined in this manner include the default value that is the contribution based on the equivalent value of the rewards gift and the points added by using the deposit gift. For example, let us assume that a rewards gift having 10,000 equivalent value points is used, and the default value of the accumulated points corresponding to this rewards gift is 8,000 points. When the reference value of the accumulated points is 10,000 points and when the distribution condition is satisfied, the accumulated points increase by 2,000 points from the default value of 8,000 points to 10,000 points by using the deposit gift. In this example, the points to be distributed are 10,000 points, of which 8,000 points are contributed by the equivalent value of the rewards gift, and 2,000 points are contributed by using the deposit gift.

The distribution executing unit 338 determines an amount of points to be distributed to each viewer to whom the distribution is to be made. The distribution executing unit 338 can determine the amount of points to be distributed to each viewer by equally dividing the points to be distributed, that is, by dividing by the total number of distribution destination viewers. Alternatively, the distribution executing unit 338 can provide the amount of points distributed in an inclined manner according to the viewing time. In other words, the distribution executing unit 338 can distribute more points to the distribution destination viewer when the viewing time of the viewer is longer. The distribution executing unit 338 can determine the amount of points so that the amount of points distributed to the viewer is greater than the total equivalent value of the deposit gifts used by the viewer.

In addition to the distribution criteria explained above, the distribution executing unit 338 can distribute more points to the distribution destination viewer when the viewer satisfies any one of the following three conditions compared to when the viewer does not satisfy any of the following three conditions:

(Condition 1) The viewer watched the livestreaming of the target streamer for the first time during the rewards gift period;

(Condition 2) The viewer followed the target streamer during the rewards gift period; and (Condition 3) The viewer joined the target streamer's army during the rewards gift period.

For example, when one of Condition 1, Condition 2, or Condition 3 is satisfied, the distribution rate can be increased by 1 percent, if two conditions are satisfied, the distribution rate can be increased by 2 percent, and if all three conditions are satisfied, the distribution rate can be increased by 5 percent. In another example, the distribution destination viewers can be divided into groups depending on the number of conditions they satisfy, and more points can be distributed to the group that satisfies the greater number of conditions.

The distribution executing unit 338 updates the user DB 316 so that the amount of points to be distributed determined as explained above is added to the points of the distribution destination viewer identified by the distribution destination identifying unit 336. The distribution executing unit 338 deletes the entry of the rewards gift for which distribution has been completed from the rewards gift DB 320. Accordingly, the rewards gift period corresponding to the deleted entry expires.

Figure 11:
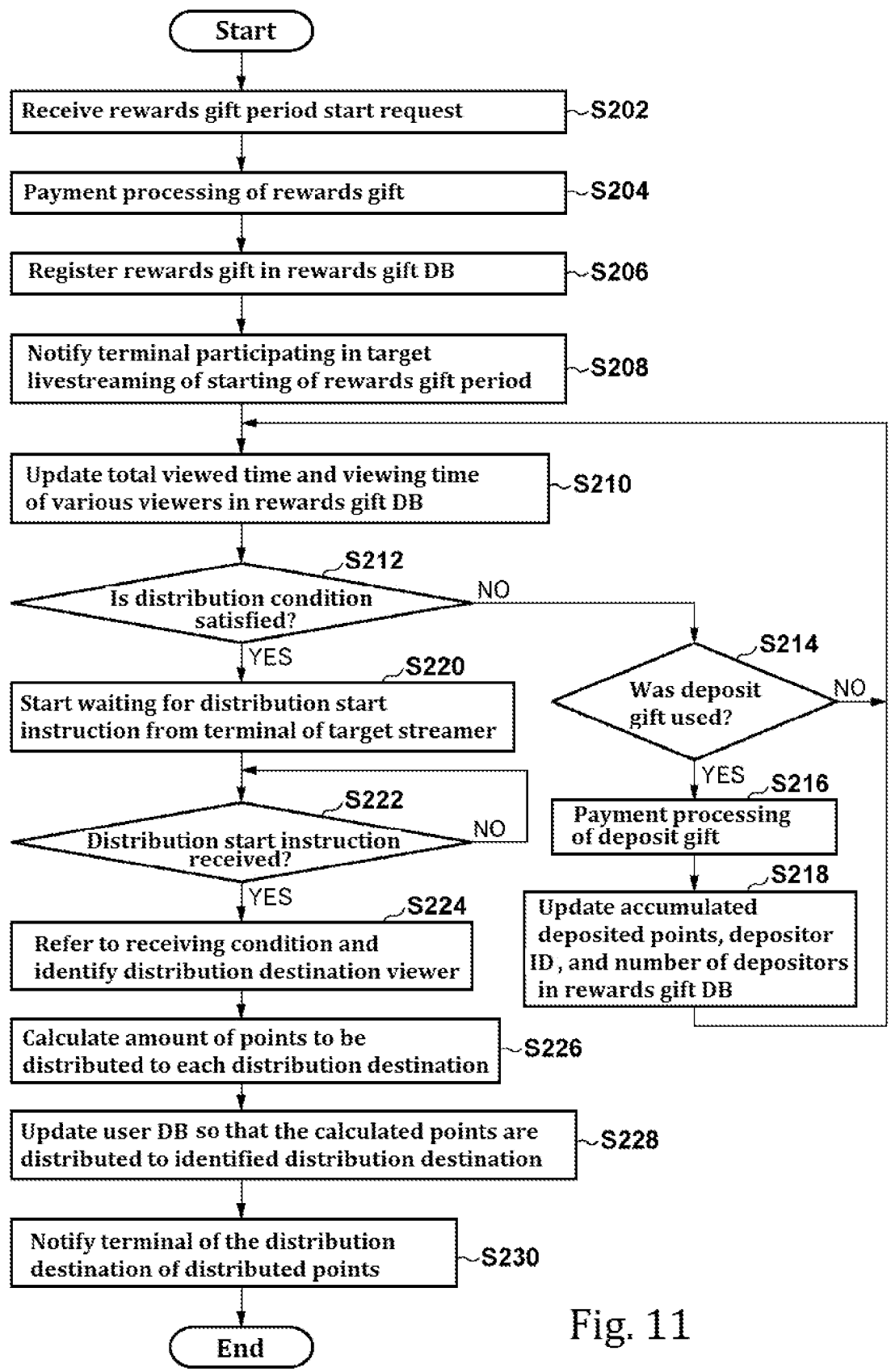
FIG. 11 is a flowchart showing a sequence of processes performed in the livestreaming system shown in FIG. 1.

Operation of the livestreaming system 1 configured as explained above will be explained below. FIG. 11 is a flowchart showing a sequence of processes performed in the livestreaming system 1. The server 10 receives a rewards gift period start request from the viewer's user terminal 30 or the streamer's user terminal 30 (Step S202). The server 10 performs payment processing for the rewards gift specified in the rewards gift period start request (Step S204). The server 10 registers the rewards gift specified by the rewards gift period start request in the rewards gift DB 320 (Step S206). Specifically, a new entry corresponding to the rewards gift is added to the rewards gift DB 320. Accordingly, the rewards gift period is started. The server 10 notifies the user terminals 20 and 30 that are participating in the livestreaming of the target streamer of the start of the rewards gift period (Step S208). When the rewards gift is registered in the rewards gift DB 320, the time period start unit 328 sends a start notification that includes the gift ID of the rewards gift and the default value of the accumulated points via the network of the user terminal 20 of the target streamer and the user terminal 30 of the viewer of the livestreaming.

The server 10 updates the total viewed time and the viewing time of each viewer of the entry added to the rewards gift DB 320 at Step S206 (Step S210). The server 10 refers to the distribution condition DB 324, and determines whether the entry added to the rewards gift DB 320 at Step S206 satisfies the distribution condition (Step S212). When it is determined that the distribution condition is not satisfied (N at Step S212), the server 10 determines whether the deposit gift was used in the livestreaming of the target streamer (Step S214). If the deposit gift is not used (N at Step S214), the process returns to Step S210. If the deposit gift is used (Y at Step S214), the server 10 performs payment processing for the deposit gift (Step S216) and updates the accumulated points, the depositor ID, and the number of depositors of the entry added to the rewards gift DB 320 at Step S206 (Step S218). Subsequently, the processing returns to Step S210.

When it is determined at Step S212 that the distribution condition is satisfied (Y at Step S212), the server 10 starts waiting for the start distribution instruction from the user terminal 20 of the target streamer (Step S220). When the start distribution instruction is received (Y at Step S222), the server 10 refers to the receiving conditions maintained in the receiving conditions DB 326 and identifies the distribution destination viewer (Step S224). The server 10 calculates the amount of points to be distributed to each distribution destination (Step S226). The server 10 updates the user DB 316 so that the amount of points calculated at Step S226 is distributed to the distribution destination viewer identified at Step S224 (Step S228). The server 10 notifies the distributed points to the user terminal 30 of the distribution destination viewer (Step S230). When the distribution is completed, the distribution executing unit 338 sends a distribution completion notification that includes the amount of distributed points to the user terminal 30 of the distribution destination viewer via the network.

Figure 12:
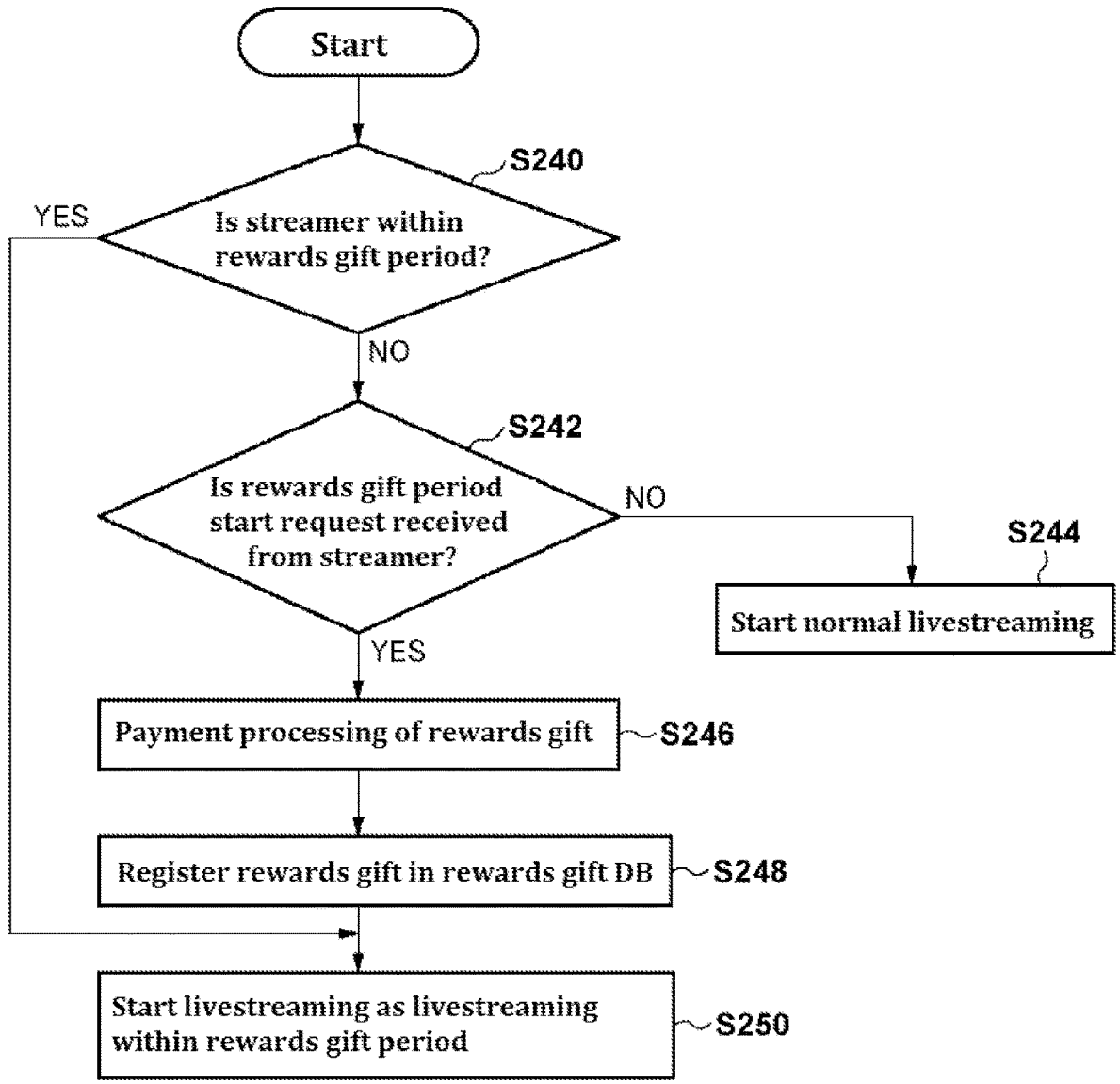
FIG. 12 is a flowchart showing a sequence of processes performed when starting a livestreaming in the livestreaming system shown in FIG. 1.

FIG. 12 is a flowchart showing a sequence of processes performed when starting a livestreaming in the livestreaming system 1. As explained above, it is assumed that the target streamer performs the livestreaming multiple times during the rewards gift period depending on the type of rewards gift. In the processing flow shown in FIG. 12, it is determined whether to perform a livestreaming during the rewards gift period, or whether to perform a normal livestreaming depending on whether the streamer is in the rewards gift period when the streamer starts the livestreaming, and whether the start of the rewards gift period is requested at the time of starting the livestreaming.

Upon receiving a notification to the effect that the livestreaming will start from the user terminal 20 of the streamer via the network NW, the streaming information providing unit 302 determines whether the streamer is within the rewards gift period (Step S240). The streaming information providing unit 302 refers to the rewards gift DB 320, and when the user ID included in the received notification is registered as the target streamer ID in the rewards gift DB 320, determines that the streamer is within the rewards gift period. When the user ID included in the received notification is registered as the target streamer ID in the rewards gift DB 320 is not registered, the streaming information providing unit 302 determines that the streamer is not within the rewards gift period. When it is determined that the streamer is within the rewards gift period (Y at Step S240), the streaming information providing unit 302 starts the livestreaming as a livestreaming during the rewards gift period (Step S250). The streaming information providing unit 302 acquires from the rewards gift DB 320 the rewards gift ID, the total viewed time, the accumulated points, and the number of depositors of the entry for which the user ID included in the received notification is set as the target streamer ID. At the time of the start of the livestreaming, the streaming information providing unit 302 sends a rewards gift period continuation notification that includes the acquired rewards gift ID, the total viewed time, the accumulated points, and the number of depositors via the network NW to the user terminal 20 of the streamer and the user terminal 30 of the viewer. The user terminals 20 and 30 that have received the rewards gift period continuation notification are caused to display a later-explained livestreaming room screen shown in FIG. 14 on the display section from the beginning of the livestreaming. Therefore, in such a livestreaming, it is possible to specify or use the deposit gift from the beginning.

Figure 13:
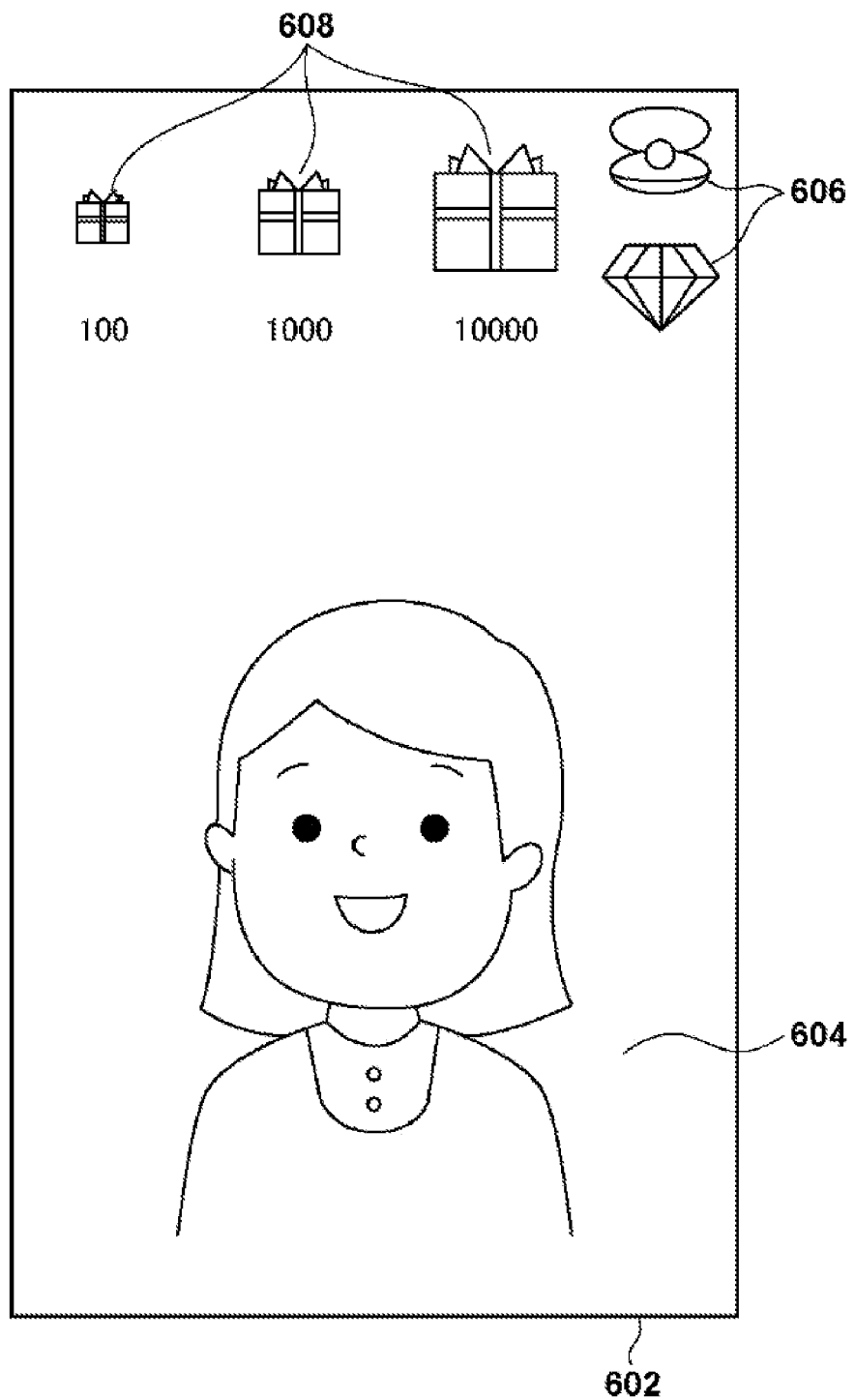
FIG. 13 is an exemplary screen diagram showing a livestreaming room screen displayed on a display section of a user terminal of a viewer.

When it is determined at Step S240 that the streamer is not within the rewards gift period (N at Step S240), it is determined whether the streaming information providing unit 302 has received a rewards gift period start request from the streamer's user terminal 20 along with the notification to the effect of starting the livestreaming (Step S242). The livestreaming start setting screen displayed on the display section of the user terminal 20 when the streamer starts the livestreaming includes an area for selecting whether to set a rewards gift. When the streamer selects to set the deposit gift in such an area and inputs an instruction to start the livestreaming, the notification sent from the user terminal 20 to the server 10 in step S240 is accompanied by a rewards gift period start request. When the rewards gift period start request has not been received (N at Step S242), the streaming information providing unit 302 starts the normal livestreaming, that is, the livestreaming outside the rewards gift period (Step S244). In such a case, the user terminals 20 and 30 are caused to display on the display section a later-explained livestreaming room screen as shown in FIG. 13. In such a state, the viewer cannot specify the deposit gift.

When the rewards gift period start request is received at Step S242 (Y at Step S242), the payment processing unit 310 performs payment processing for the rewards gift (Step S246), the rewards gift processing unit 312 registers the rewards gift in the rewards gift DB 320 (Step S248), and the streaming information providing unit 302 starts the livestreaming within the rewards gift period (Step S250). As explained above, in the present embodiment, the rewards gift period can be started in four ways: (1) the viewer uses the rewards gift while viewing the livestreaming; (2) the streamer uses the rewards gift while the livestreaming is being streamed; (3) the streamer within the rewards gift period starts the livestreaming, and (4) the streamer selects to use the rewards gift and starts the livestreaming.

FIG. 13 is an exemplary screen diagram of the livestreaming room screen 602 displayed on the display section of the user terminal 30a of the viewer AU1 shown in FIG. 1. The livestreaming room screen 602 shown in FIG. 13 corresponds to the normal livestreaming, that is, the livestreaming outside the rewards gift period, and is therefore configured not to receive any specification of the deposit gift. The livestreaming room screen 602 includes an image 604 of the streamer LV obtained by playing the video data received from the server 10, a normal gift object 606 that corresponds to the normal gift, and a rewards gift object 608 that corresponds to the rewards gift. In the example shown in FIG. 13, the rewards gift objects include three rewards gift objects 608 that correspond to three rewards gifts identified by gift IDs "SPA", "SPB" and "SPC" shown in FIG. 7.

When the playback of the video data starts, that is, when viewing of the livestreaming starts, the streaming information providing unit 302 of the server 10 refers to the gift DB 318 and identifies the available gift IDs. When the normal livestreaming starts, the streaming information providing unit 302 excludes the gift IDs with "deposit" gift type from the available gift IDs. The streaming information providing unit 302 generates a gift information that includes the identified gift IDs and sends the information to the user terminal 30a. The superimposed information generating unit 204 of the user terminal 30a includes the normal gift object 606 of the normal gift and the rewards gift object 608 of the rewards gift specified by the gift ID included in the gift information in the frame image. The viewing-side UI control unit 202 displays on the display section the moving image on which the frame image is superimposed.

In the example shown in FIG. 13, the rewards gift object 608 is displayed together with the normal gift object 606 on the livestreaming room screen 602; however, in another example, an icon for displaying the rewards gift object 608 can be provided in the livestreaming room screen 602. In such a configuration, when the viewer AU1 taps the icon, the viewing-side UI control unit 202 starts displaying the rewards gift object 608 in association with the tapped icon.

The viewer AU1 taps the rewards gift object of a desired rewards gift to support or "endorse" the streamer LV. When the viewing-side UI control unit 202 receives the rewards gift instruction, that is, the rewards gift object instruction from the viewer AU1, the input information transmission unit 206 generates the rewards gift period start request that includes the rewards gift ID of the specified rewards gift, the viewer ID of the viewer AU1, and the streamer ID of the streamer LV, and transmits the same to the server 10 via the network NW. The processing performed in the server 10 after receiving the rewards gift period start request is as explained above. The user terminals 20, 30a, and 30b receive from the server 10 a start notification that corresponds to the transmitted rewards gift period start request. Based on the start notification, the user terminals 20, 30a, and 30b display on the display section the livestreaming room screen 610 during the rewards gift period.

Figure 14:
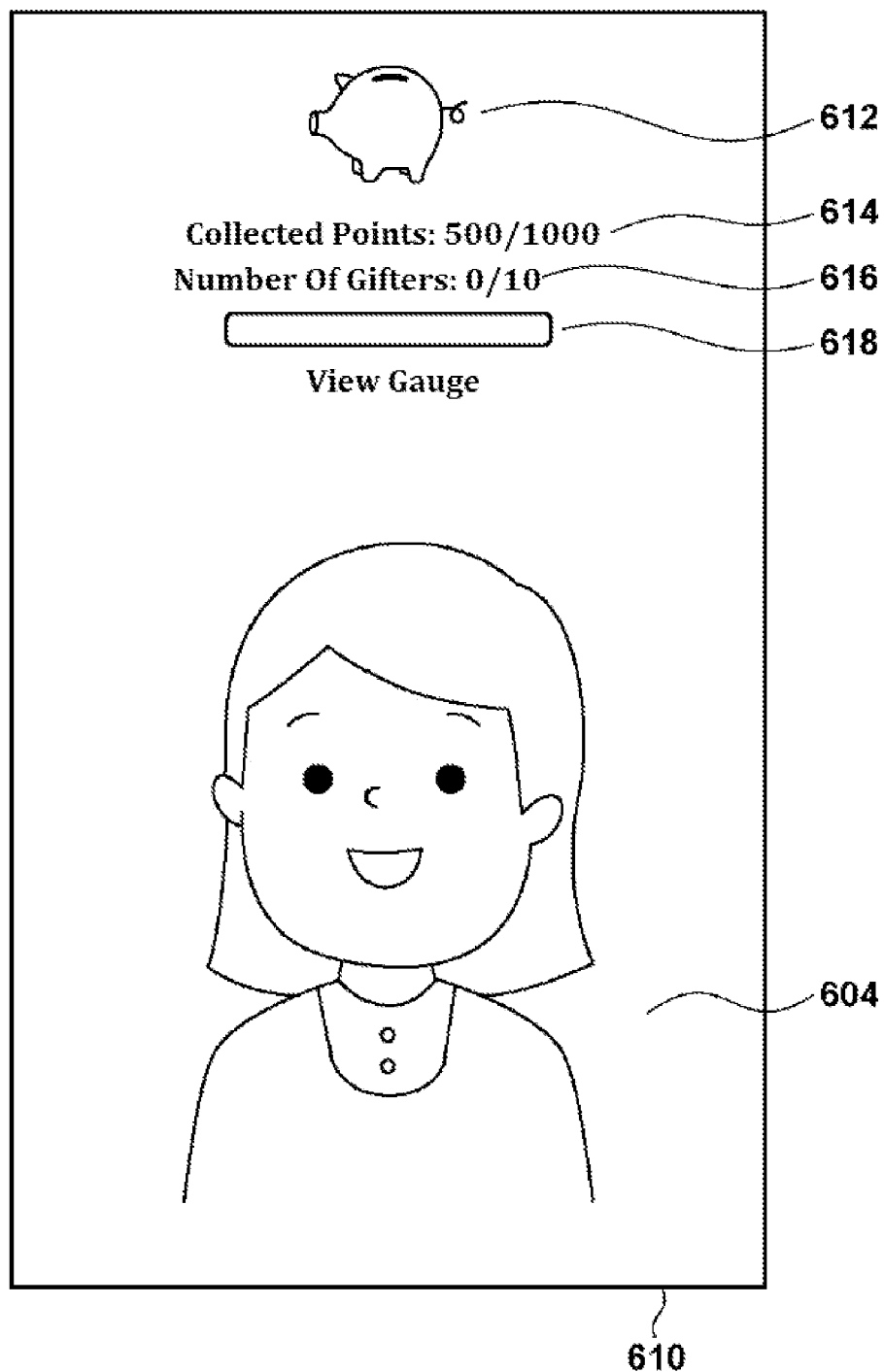
FIG. 14 is an exemplary screen diagram showing a livestreaming room screen displayed on a display section of a user terminal of another viewer.

FIG. 14 is another exemplary screen diagram of the livestreaming room screen 610 displayed on the display section of the user terminal 30b of the viewer AU2 shown in FIG. 1. The livestreaming room screen 610 shown in FIG. 14 corresponds to the livestreaming during the rewards gift period, and is therefore configured to be able to receive the deposit gift instruction. A livestreaming room screen 610 includes an image 604 of the streamer LV, a deposit target object 612 that corresponds to the rewards gift identified by the rewards gift ID included in the start notification, an accumulated points display area 614 that displays the default value of accumulated points included in the start notification, a number of depositors display area 616 that displays the number of depositors, and a total viewed time gauge 618 that indicates the total viewed time. Because the start notification is also transmitted to the user terminal 30a of the viewer AU1 and the user terminal 20 of the streamer LV, a screen similar to the livestreaming room screen 610 is also displayed on the display sections of these terminals. In the example shown in FIG. 14, the deposit target object 612 functions as a flow line for specifying the deposit gift. In another example, in addition to or instead of the deposit target object 612, a later-explained deposit gift object can be displayed on the livestreaming room screen 610.

The superimposed information generating unit 204 includes the deposit target object 612, the accumulated points display area 614, the number of depositors display area 616, and the total viewed time gauge 618 in the frame image. The viewing-side UI control unit 202 displays on the display section the moving image on which the frame image is superimposed. While receiving and playing the video data related to the livestreaming (for example, while another viewer AU2 is viewing the livestreaming), the viewing unit 200 periodically or at predetermined time intervals generates an update request to acquire an updated value of the parameter relating to the rewards gift period, and transmits the same to the server 10 via the network NW. The update request includes the streamer ID of the streamer LV of the livestreaming. Upon receiving the update request, the rewards gift processing unit 312 refers to the rewards gift DB 320, and acquires the total viewed time, the accumulated points, and the number of depositors of the entry for which the streamer ID included in the update request is set as the target streamer ID. The rewards gift processing unit 312 generates an update response that includes the acquired information, and transmits the same to the user terminal 30b via the network NW. The superimposed information generating unit 204 updates the display contents of the accumulated points display area 614, the number of depositors display area 616, and the total viewed time gauge 618 of the frame image according to the received update response.

When another viewer AU2 taps the deposit target object 612 on the livestreaming room screen 610 shown in FIG. 14, the viewing-side UI control unit 202 displays the deposit gift selection screen 620 on the display section.

Figure 15:
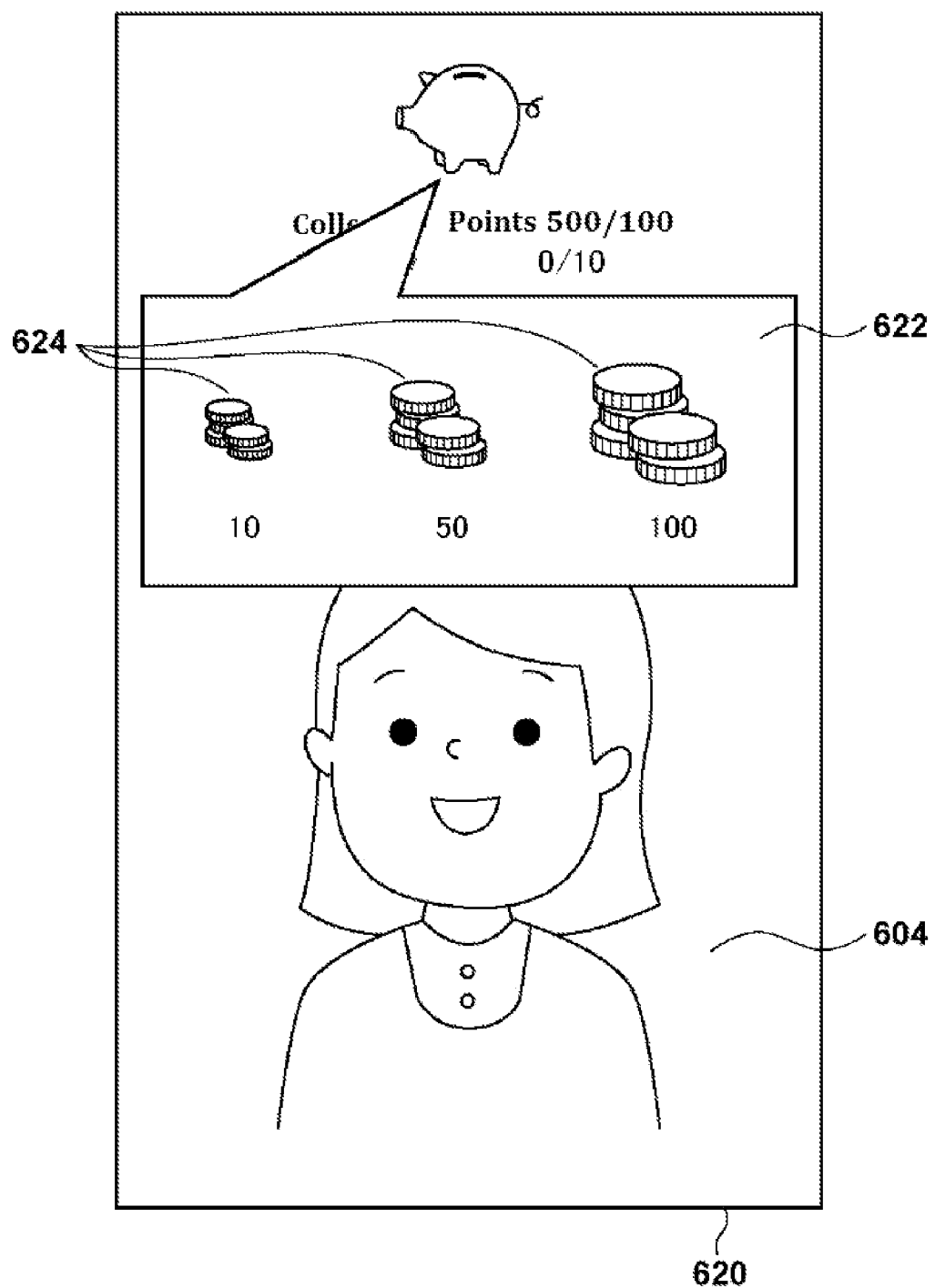
FIG. 15 is an exemplary screen diagram showing a deposit gift selection screen on the display section of the user terminal of another viewer.

FIG. 15 is an exemplary screen diagram of the deposit gift selection screen 620 displayed on the display section of the user terminal 30b of another viewer AU2. The deposit gift selection screen 620 is a screen on which a deposit gift selection pop-up 622 is superimposed on the livestreaming room screen 610 shown in FIG. 14. The deposit gift selection pop-up 622 includes three deposit gift objects 624 corresponding to three deposit gifts identified by the gift IDs "QQ1", "QQ2", and "QQ3" shown in FIG. 7.

Another viewer AU2 taps the deposit gift object of the deposit gift of a desired equivalent value. When the viewing-side UI control unit 202 receives a specification of the deposit gift by the another viewer AU2, that is, specification of the deposit gift object, the input information transmission unit 206 generates a gift specifying signal that includes the deposit gift ID of the specified deposit gift, the viewer ID of the viewer AU2, and the streamer ID of the streamer LV and transmits the same to the server 10 via the network NW. The processing performed in the server 10 after receiving the gift specifying signal is as explained above. Upon completing the payment processing and the update of the rewards gift DB 320 in response to the reception of the gift specification signal, the rewards gift processing unit 312 acquires the total viewed time, the accumulated points, and the number of depositors of the entry for which the streamer ID included in the gift specifying signal is set as the target streamer ID. The rewards gift processing unit 312 generates a deposit completion notification that includes the acquired information, and transmits the same to the user terminal 30b via the network NW. The superimposed information generating unit 204 updates the display contents of the accumulated points display area 614, the number of depositors display area 616, and the total viewed time gauge 618 of the frame image according to the received deposit completion notification.

Figure 16:
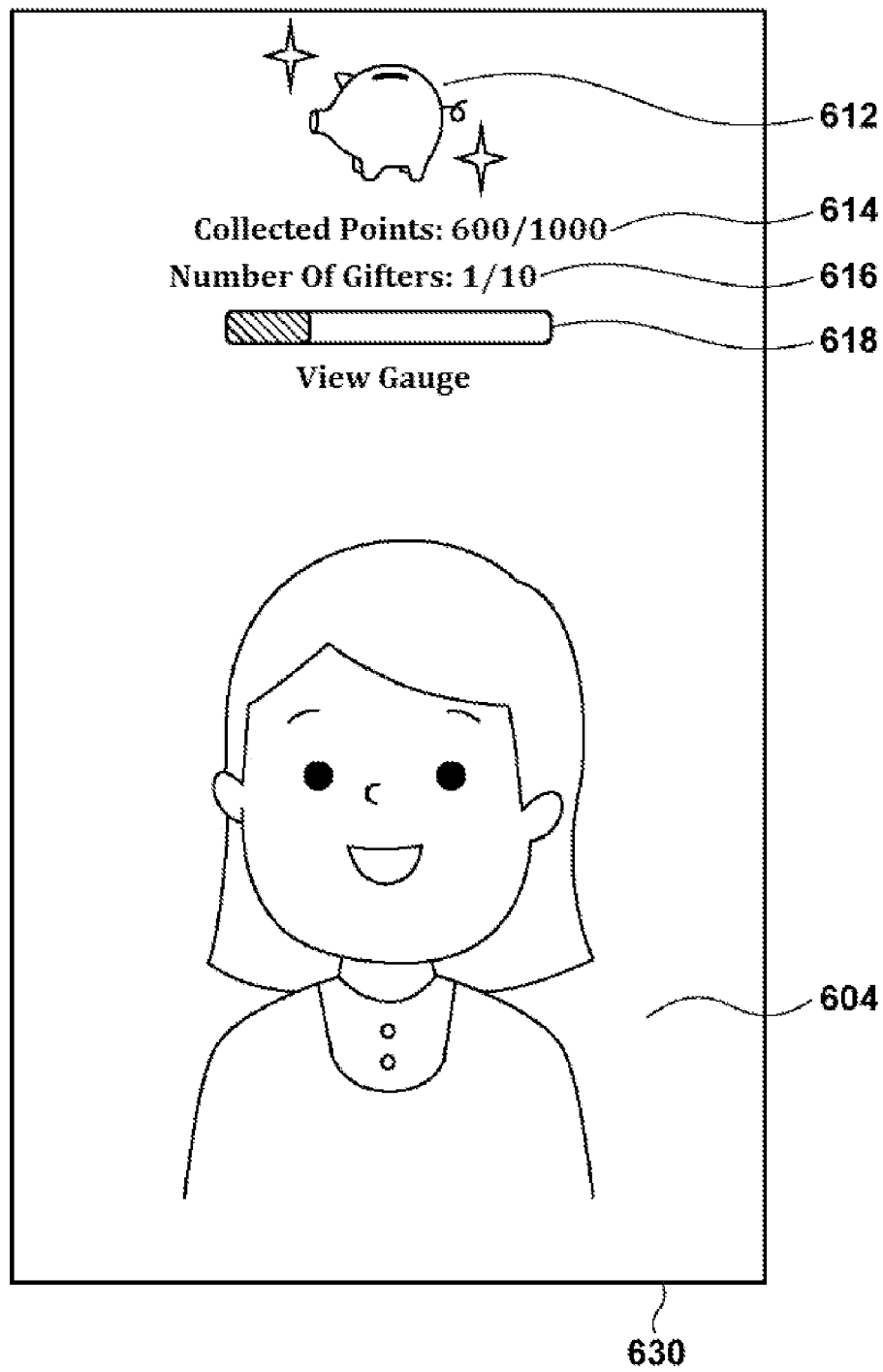
FIG. 16 is an exemplary screen diagram showing the livestreaming room screen on the display section of the user terminal of another viewer.

FIG. 16 is another exemplary screen diagram of the livestreaming room screen 630 displayed on the display section of the user terminal 30b of the another viewer AU2. When the another viewer AU2 taps the deposit gift object of the deposit gift with the equivalent value of "100" points on the deposit gift selection screen 620 shown in FIG. 15, the livestreaming room screen 630 shown in FIG. 16 is displayed on the display section. The display contents of the accumulated point display area 614, the number of depositors display area 616, and the total viewed time gauge 618 are updated according to the information included in the deposit completion notification. The deposit target object 612 is provided with a visual effect that indicates that points have been added by using the deposit gift.

Accordingly, the deposit gift can be used in the livestreaming of the streamer within the rewards gift period, and cannot be used in the livestreaming of the streamer outside the rewards gift period.

Figure 17:
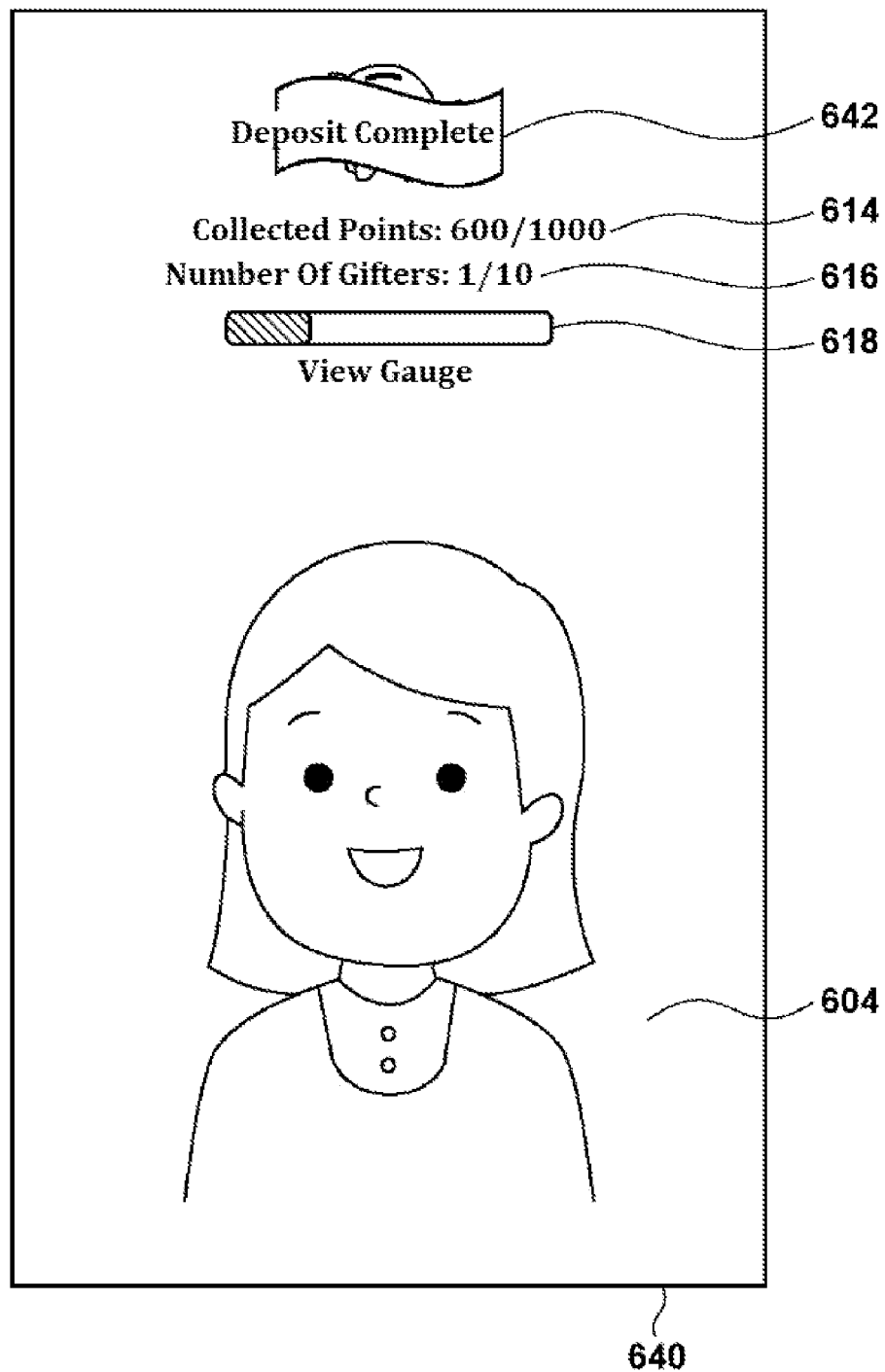
FIG. 17 is an exemplary screen diagram showing the livestreaming room screen on the display section of the user terminal of another viewer.

FIG. 17 is another exemplary screen diagram of the livestreaming room screen 640 displayed on the display section of the user terminal 30 of the viewer AU2. When a predetermined time period of 1 second or 5 seconds is elapsed on the livestreaming room screen 630 shown in FIG. 16, the livestreaming room screen 640 shown in FIG. 17 is displayed on the display section. The livestreaming room screen 640 includes a deposit completed object 642 that indicates that the deposit gift has already been used, instead of the deposit target object 612. In the present embodiment, a deposit condition in which the viewer can use the deposit gift only once during the rewards gift period of the target streamer is adopted. The deposit completed object 642 varies from the deposit target object 612, and is not displayed on the deposit gift selection pop-up 622 even when tapped or specified. Accordingly, the viewer can recognize that he/she has already used the deposit gift. Moreover, by removing the flow line for using the deposit gift, mistaken duplication of gifts can be prevented.

The control of the use of the deposit gift according to the offer conditions can be realized, for example, by providing an offer history registration unit, a deposit history DB, and a deposit condition determining unit in the user terminals 20 and 30 or the server 10. When the deposit gift is used, the deposit history registration unit associates the gift ID of that deposit gift, the time when the deposit gift was used, the viewer ID of the viewer who used that deposit gift, the streamer ID of the streamer of the livestreaming in which the deposit gift was used, the stream ID of the livestreaming in which the deposit gift is used, and stores the same in the deposit history DB. The deposit condition determining unit determines whether to permit the use of the deposit gift based on the set deposit condition and the use history of the deposit gift registered in the deposit history DB. When the rewards gift period of a certain streamer expires, the deposit history registration unit deletes the entry that includes the streamer ID of the corresponding streamer from the deposit history DB.

Any of the following conditions can be adopted as the deposit condition:
(1) Only once during the rewards gift period
   The viewer can use the deposit gift only once during the rewards gift period of the target streamer. However, in other embodiments, another limit value such as two times or three times can be set for the number of times the deposit gift is used.
(2) Time recovery
   When a viewer uses the deposit gift, he/she must watch the livestreaming for a predetermined time period until the next deposit gift can be used. Such a predetermined time period can be constant, or can be set to be longer as the number of times the deposit gift is used increases.
(3) Only once through livestreaming
   The viewer can use the deposit gift only once in the livestreaming during the rewards gift period of the target streamer. When the livestreaming ends, the time is reset, and the deposit gift can be used again only once in the next livestreaming during the rewards gift period.
(4) Upper limit on total amount
   An upper limit is set on the total amount of the deposit gifts that can be used during the rewards gift period for the target streamer.

Figure 18:
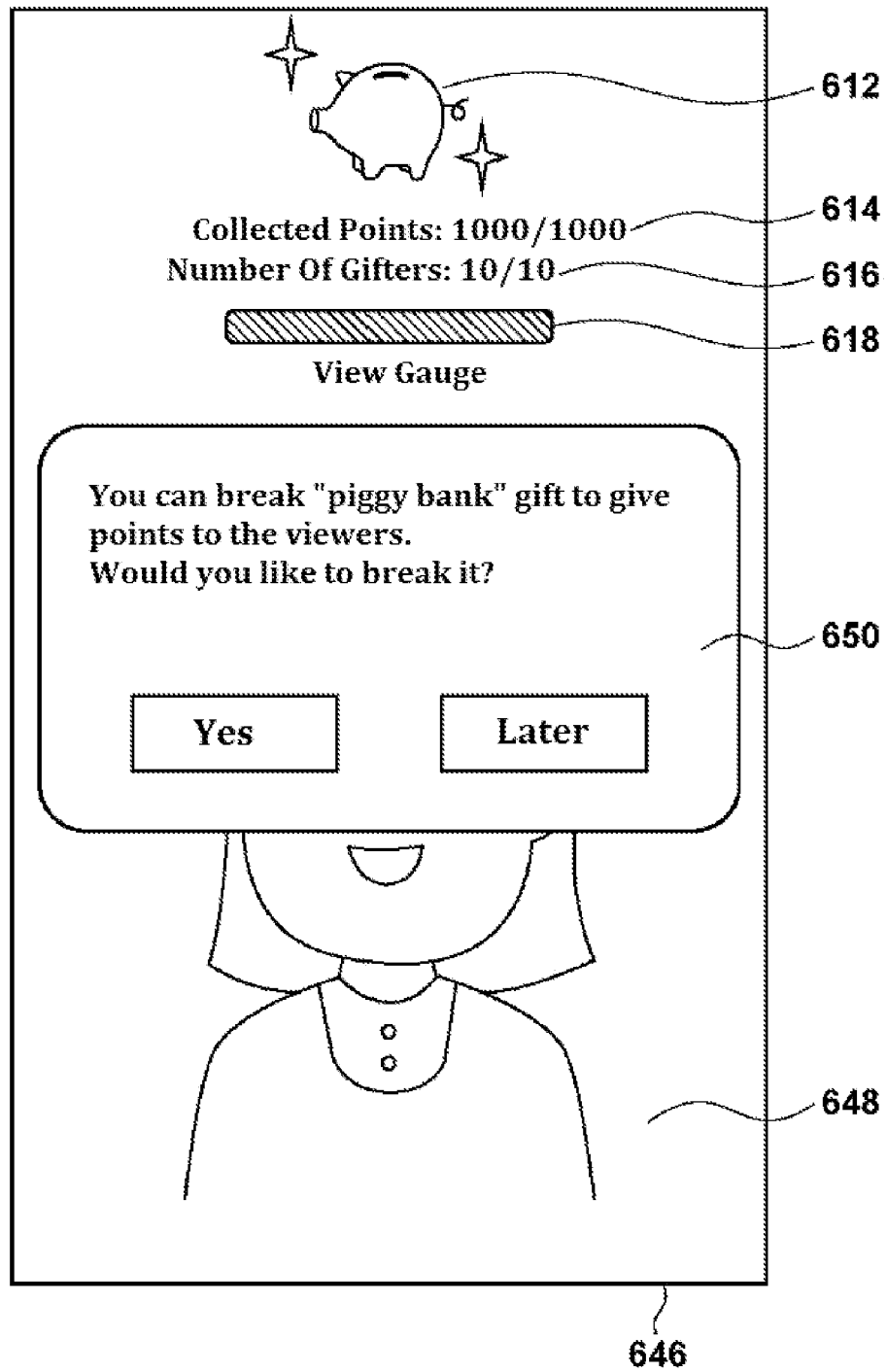
FIG. 18 is an exemplary screen diagram showing a livestreaming room screen displayed on a display section of a user terminal of a streamer.

FIG. 18 is an exemplary screen diagram of the livestreaming room screen 646 displayed on the display section of the user terminal 20 of the streamer LV shown in FIG. 1. The livestreaming room screen 646 shown in FIG. 18 is a screen that is displayed on the display section by the user terminal 20 that has received the request for the streaming start instruction at Step S220 in FIG. 11. The livestreaming room screen 646 includes an image 648 of the streamer LV obtained by playing the video data to be transmitted to the server 10, a deposit target object 612, an accumulated points display area 614, a number of depositors display area 616, a total viewed time gauge 618, and a distribution start instruction input area 650. The streaming-side UI control unit 108 superimposes the distribution start instruction input area 650 on the livestreaming room screen in response to the reception of the distribution start instruction request. The streamer LV can tap the "Yes" button on the distribution start instruction input area 650 at a desired time. Upon detecting that the "yes" button has been tapped, the streaming-side UI control unit 108 generates an instruction to start distribution and transmits the same to the server 10 via the network NW. When the "Later" button on the distribution start instruction input area 650 is tapped, the streaming-side UI control unit 108 temporarily hides the distribution start instruction input area 650, and displays the distribution start instruction input area 650 again after a predetermined time period has elapsed.

Accordingly, because the streamer LV can start distribution at any time after the distribution condition is satisfied, the streamer LV can support considerations for the viewers, such as inviting important viewers who happen to be absent before starting the distribution, and the like.

Figure 19:
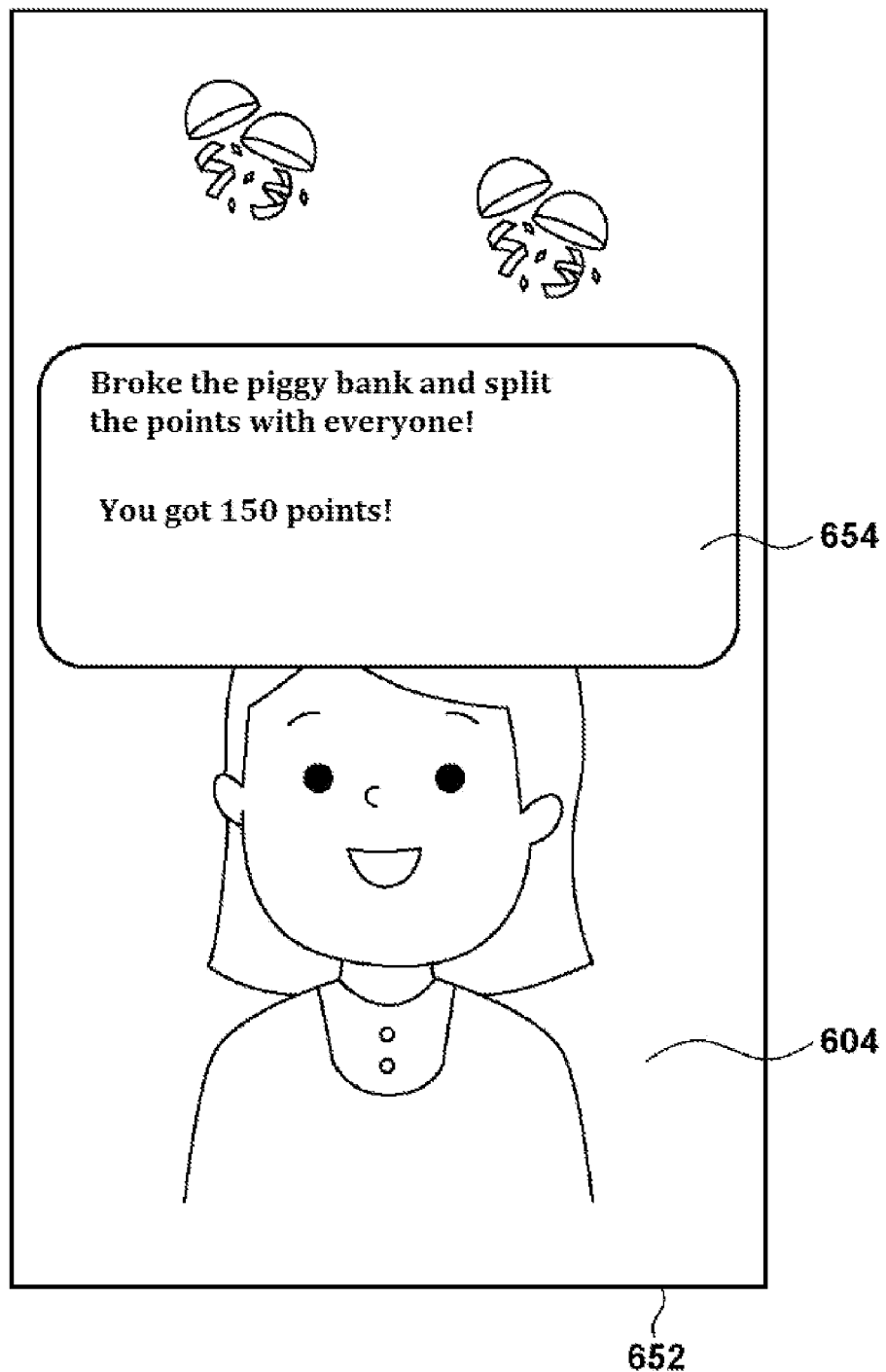
FIG. 19 is an exemplary screen diagram showing the livestreaming room screen on the display section of the user terminal of another viewer.

FIG. 19 is another exemplary screen diagram of the livestreaming room screen 652 displayed on the display section of the user terminal 30b of the viewer AU2. The livestreaming room screen 652 shown in FIG. 19 is a screen that is displayed on the display section by the user terminal 30b that has received the distribution completion notification at Step S230 in FIG. 11. When the streamer LV taps the "Yes" button on the livestreaming room screen 646 shown in FIG. 18, the livestreaming room screen 652 shown in FIG. 19 is displayed on the display section of the user terminal 30b of another viewer AU2. The livestreaming room screen 652 includes the image 604 of the streamer LV and a message 654 that includes a text indicates the amount of points distributed to the another viewer AU2. The superimposed information generating unit 204 generates the message 654 according to the distributed point amount included in the received distribution completion notification, and includes the same in the frame image.

Figure 20:
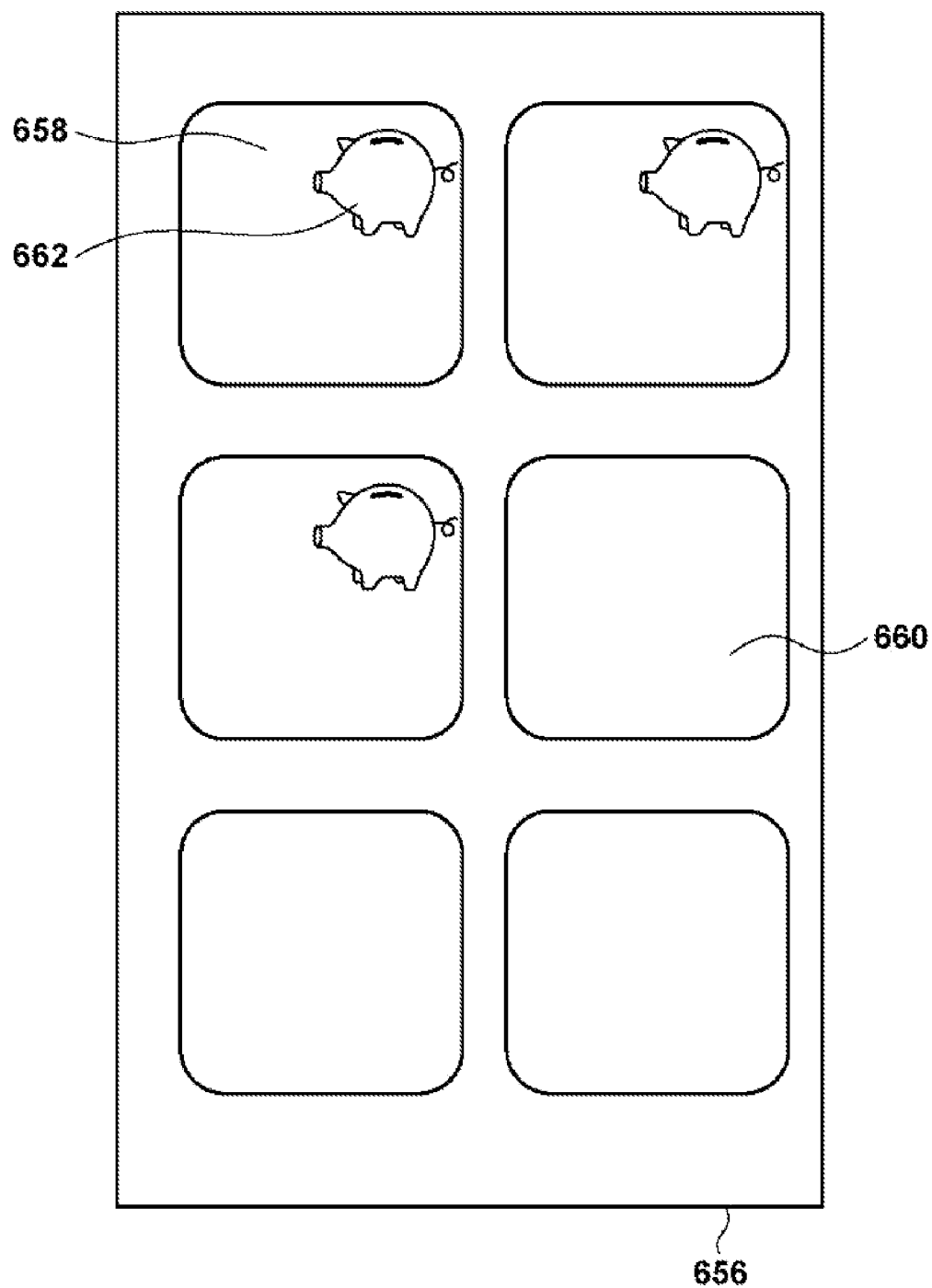
FIG. 20 is an exemplary screen diagram showing a livestreaming selection screen displayed on the display section of the user terminal of the viewer.

FIG. 20 is an exemplary screen diagram of the livestreaming selection screen 656 that is displayed on the display section of the user terminal 30 of the viewer. The livestreaming selection screen 656 includes thumbnails 658 and 660 that indicate various livestreams in a list of currently viewable livestreams received from the server 10. The viewing-side UI control unit 202 generates a livestreaming selection screen 656 based on the list of livestreams acquired from the server 10, and displays the same on the display section. The viewing-side UI control unit 202 refers to a flag included in the list, and displays the thumbnail 658 of the livestreaming of the streamer within the rewards gift period and the thumbnail 660 of the livestreaming of the other streamer in different states. An object 662 that indicates that the deposit target object is set in the livestreaming of the streamer is added to the thumbnail 658 of the streamer's livestreaming during the rewards gift period.

On the livestreaming selection screen 656, the thumbnail 658 of the livestreaming of the streamer during the rewards gift period is placed in a more conspicuous position than the thumbnail 660 of the livestreaming of the other streamers, for example, at the top of the screen. Accordingly, the livestreaming of the streamer that is within the rewards gift period can be promoted on the livestreaming platform.

Figure 21:
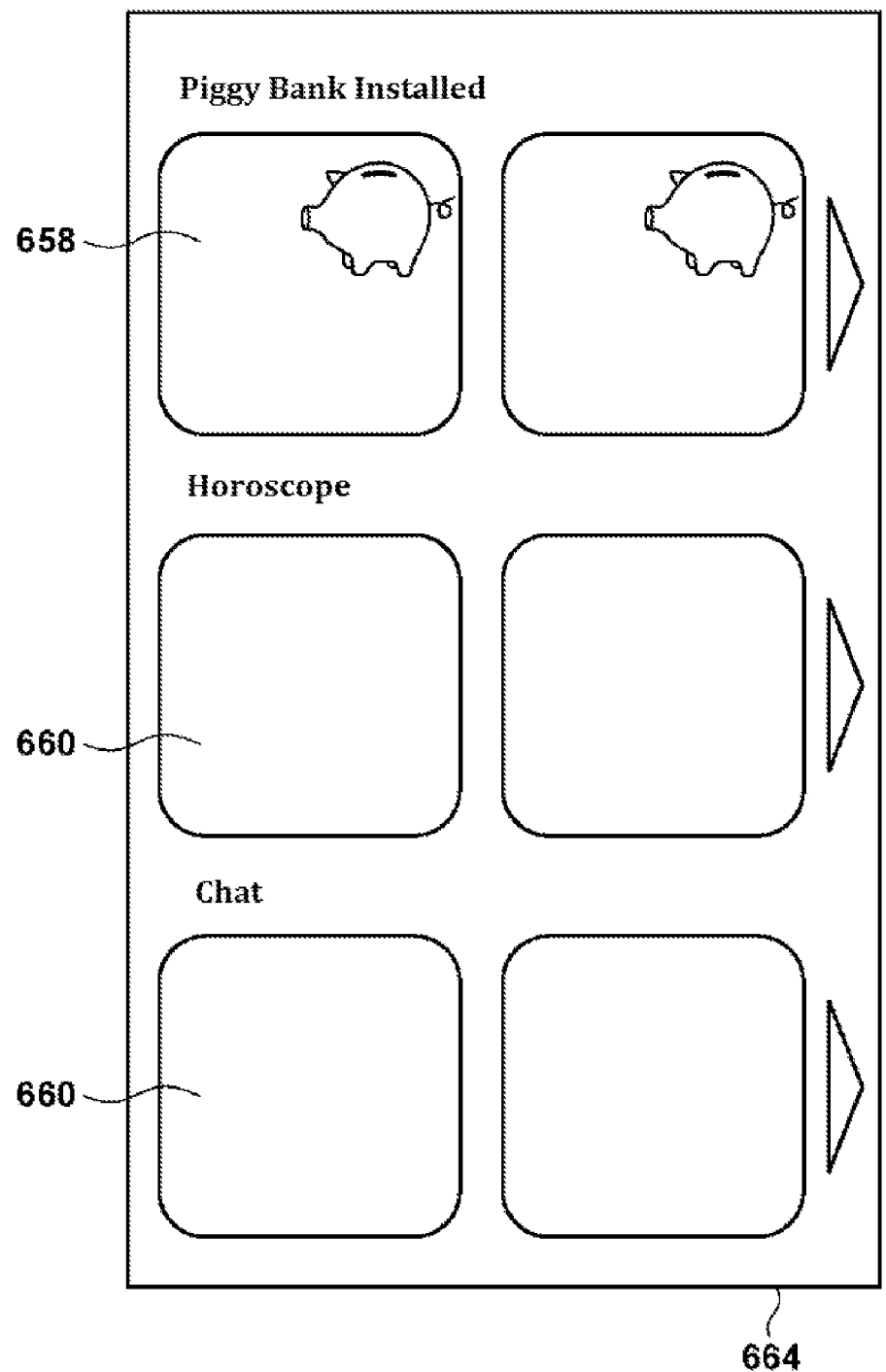
FIG. 21 is an exemplary screen diagram of a genre-wise livestreaming selection screen displayed on the display section of the user terminal of the viewer.

FIG. 21 is an exemplary screen diagram of a genre-wise livestreaming selection screen 664 that is displayed on the display section of the user terminal 30 of the viewer. The thumbnails of the viewable livestreams are arranged by genre and displayed on the genre-wise livestreaming selection screen 664. In the example shown in FIG. 21, the thumbnails 658 of the livestreaming of the streamer who is "installing a piggy bank", that is, within the rewards gift period is displayed in the top row, and the thumbnails 660 of the livestreaming of the "fortune-telling" genre is displayed in the middle row, and the thumbnails 660 of livestreaming of the "chat" genre are displayed in the bottom row. On the genre-wise livestreaming selection screen 664, a genre called livestreaming of the streamers during the rewards gift period is arranged in a position that is more conspicuous than other genres, for example, at the top of the screen. Accordingly, the livestreaming of the streamer that is within the rewards gift period can be promoted on the livestreaming platform.

In the above embodiments, examples of storing units are hard disks and semiconductor memories. Moreover, based on the explanation of the present specification, a person skilled in the art can grasp that various units can be realized by a not-shown CPU, an installed application program module, a system program module, a semiconductor memory that temporarily stores the contents of data read from the hard disk, and the like.

According to the livestreaming system 1 according to the present embodiment, when the streamer himself/herself or the viewer who supports the streamer use the rewards gift, more viewers can be attracted to the target streamer's livestreaming. Furthermore, by including the viewed time condition in the distribution condition of the rewards gift, it becomes possible for more viewers to watch the livestreaming of the target streamer for a longer period of time. Accordingly, an opportunity to promote the target streamer can be created. Moreover, the viewer can also be provided with the opportunity to discover new, high-quality livestreaming. The rewards gifts can provide the streamer who has just started livestreaming or a middle-ranked streamer an opportunity to become higher-level streamer (streamer who receive more attention).

Moreover, in the livestreaming system 1 according to the present embodiment, a default value corresponding to the value of the rewards gift is added to the accumulated points. Therefore, in many cases, the viewer who has used the deposit gift can be rewarded with more points than the points spent to use the deposit gift. As a result, more viewers gather in the streamer's livestreaming during the rewards gift period in search of profits, and the viewers watch the livestreaming for a longer period of time to satisfy the distribution condition and the receiving condition. This becomes an opportunity for a streamer to market the merit of their livestreaming to many viewers. Moreover, the viewer who sent the rewards gift loses points in total; however, on the other hand, the purpose of recommending the streamer who has received the rewards gift can be achieved.

In the livestreaming system 1 according to the present embodiment, the distribution condition includes the total viewed condition, and the receiving condition includes the viewing time condition. Therefore, for the viewer to receive the point rewards, it is not enough to simply use the deposit gift, and it is necessary to continue watching the livestreaming of the target streamer for a long time. By extending the viewing time and the viewed time in such a manner, conveying the merit of the streamer to the viewers becomes easier, and engagement of the viewers with the livestreaming can be increased.

In the livestreaming system 1 according to the present embodiment, use of the deposit gift is restricted by the deposit condition. Particularly, the same viewer is restricted from repeatedly using the deposit gift, or from using a high-value deposit gift. Therefore, the viewers are encouraged to collect more viewers to receive rewards quickly, and actively promote the livestreaming of the target streamer via a circulating means such as social networking service (SNS). Accordingly, discovery of a livestreaming by the viewers can be facilitated.

In the livestreaming system 1 according to the present embodiment, on the livestreaming selection screen, the livestreaming of the streamer during the rewards gift period is arranged in a more conspicuous position than that in the other types of livestreaming. Accordingly, needs of streamers who want new fans and users who want to discover new streamers can be quickly met.

Second Embodiment

In the first embodiment, when the viewer uses the deposit gift to increase the accumulated points and satisfies the distribution condition that includes the viewing time condition, the points indicated by the accumulated points can be distributed to the viewer. In the second embodiment, a lottery is drawn, instead of satisfying the distribution condition. When the viewer uses the deposit gift, a lottery is drawn using a winning probability that increases as the viewing time of the viewer watching the livestreaming of the target streamer increases. When the viewer wins the lottery, the points indicated by the accumulated points are distributed to the viewer.

Figure 22:
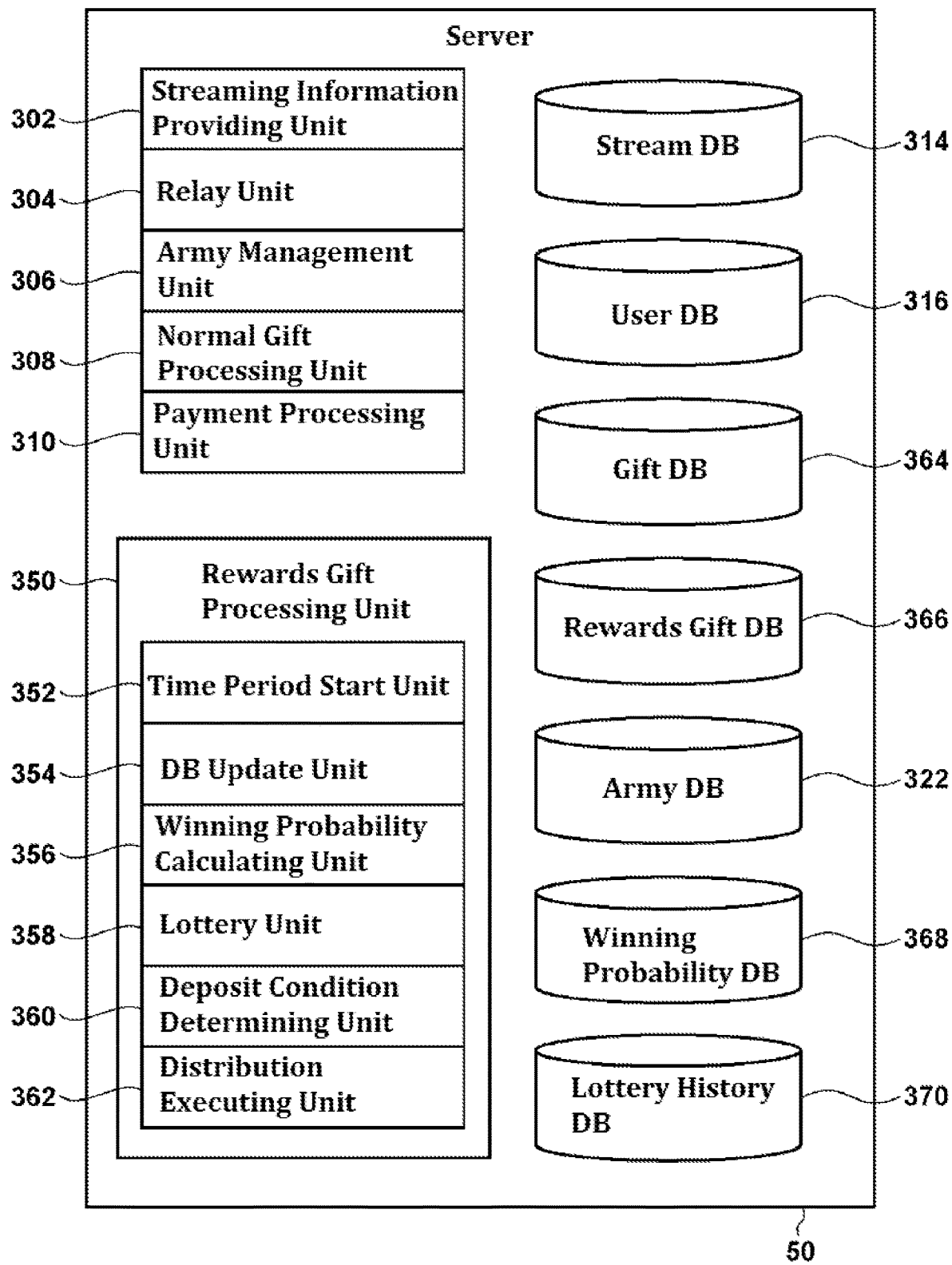
FIG. 22 is a block diagram showing functions and configuration of a server according to a second embodiment.

FIG. 22 is a block diagram showing the functions and configuration of a server 50 according to the second embodiment. The server 50 includes a streaming information providing unit 302, a relay unit 304, an army management unit 306, a normal gift processing unit 308, a payment processing unit 310, a rewards gift processing unit 350, a stream DB 314, a user DB 316, a gift DB 364, a rewards gift DB 366, an army DB 322, a winning probability DB 368, and a lottery history DB 370.

FIG. 23 is a data structure diagram showing an example of the gift DB 364 shown in FIG. 22. The gift DB 364 maintains information by associating the gift ID, the awarded points, the equivalent value points, and the gift type. The available gift types include normal, rewards and lottery. The lottery gift is only available during the rewards gift time period, and when used, equivalent value points are deducted from the sending viewer's points, and the equivalent value points are added to the accumulated points for the applicable rewards gift period to start the lottery. In the example in FIG. 23, the rewards gifts "JKPA", "JKPB", and "JKPC" correspond to the lottery gifts "Ticket A", "Ticket B", and "Ticket C", respectively.

FIG. 24 is a data structure diagram showing an example of the rewards gift DB 366 shown in FIG. 22. The reward gift DB 366 maintains information by associating the target streamer ID, the rewards gift ID, the start time of the rewards gift period, the viewing time of each viewer during the rewards gift period, the accumulated points that either gets updated or increase when a lottery gift is used during the target streamer's livestreaming, and the lottery frequency for each viewer during the target streamer's livestreaming. The reward gift DB 366 can maintain other parameters such as the number of comments by each viewer in the target streamer's livestreaming during the rewards gift period.

FIG. 25 is a data structure diagram showing an example of the winning probability DB 368 shown in FIG. 22. The winning probability DB 368 maintains a formula for calculating the winning probability. The winning probability for DB 368 maintains information by associating the rewards gift ID of the rewards gift to which the formula is applied, and the formula for calculating the winning probability. The formula is set such that the longer the viewing time of viewers who have used the lottery gift, the higher the winning probability. When the lottery frequency is used as a parameter, the formula is set such that the higher the lottery frequency, the higher the winning probability. When the comments are used as a parameter, the formula is set such that the more comments the higher the winning probability. Other parameters related to the livestreaming can also be included in the formula.

FIG. 26 is a data structure diagram showing an example of the lottery history DB 370 shown in FIG. 22. The lottery history DB 370 maintains the history of lottery gift use. The lottery history DB 370 maintains information by associating the lottery gift ID of the used lottery gift, the time at which the lottery gift is used, the viewer ID of the viewer that has used the lottery gift, the streamer ID of the streamer of the livestreaming who used the lottery gift, the total viewing time which is the total time that the viewer who used that lottery gift viewed the target streamer's livestreaming from the time of using the lottery gift until now.

In FIG. 22, the rewards gift processing unit 350 updates the rewards gift DB 366 when the gift identified by the gift ID included in the gift specifying signal is the rewards gift or the lottery gift. Upon receiving the rewards gift period start request, the rewards gift processing unit 350 starts the rewards gift period during which it possible to use the lottery gift that is different from the rewards gift in the livestreaming of the target streamer. When the viewer in the livestreaming of the target streamer uses the lottery gift during the rewards gift period, the rewards gift processing unit 350 performs the lottery according to the winning probability that increases the longer that viewer viewed the target streamer's livestreaming. When the lottery is won, the rewards gift processing unit 350 enables the distribution of the accumulated points associated with the rewards gift to the viewer. The rewards gift processing unit 350 includes a time period start unit 352, a DB update unit 354, a winning probability calculating unit 356, a lottery unit 358, a deposit condition determining unit 360, and distribution executing unit 362.

When the gift identified by the gift ID included in the gift specifying signal is the rewards gift, the time period start unit 352 starts the rewards gift period by registering a new entry to the rewards gift DB 366. The time period start unit 352 registers the streamer ID, the gift ID of the rewards gift, the time at which the rewards gift is used on the user terminal, and the default value of the accumulated points included in the gift specifying signal to the target streamer ID, rewards gift ID, start time, and accumulated points of the rewards gift DB 366. The time period start unit 352 calculates the default value of the accumulated points based on the equivalent value points of the rewards gift.

The DB update unit 354 updates the entry corresponding to the rewards gift DB 366 when the gift identified by the gift ID included in the gift specifying signal is the lottery gift. In the rewards gift DB 366, the DB update unit 354 adds the equivalent value points of the lottery gift identified by the gift ID included in the gift specifying signal to the accumulated points of the entry in which the streamer ID included in the gift specifying signal is the target streamer ID. In the lottery frequency for each viewer of the entry for which the target streamer ID is the streamer ID included in the gift specifying signal, the DB update unit 366 increases the lottery frequency corresponding to the viewer ID included in the gift specifying signal by one (if the viewer ID does not exist, it is newly registered).

When the gift identified by the gift ID included in the gift specifying signal is the lottery gift, the DB update unit 354 registers a new entry corresponding to the lottery history DB 370. The DB update unit 354 registers the gift ID of the lottery gift included in the gift specifying signal, the time at which the lottery gift is used on the user terminal, the viewer ID, and the streamer ID to the lottery gift ID, the use time, the viewer ID, and the target streamer ID of the lottery history DB 370.

The DB update unit 354 identifies the livestreaming streamed by the streamer identified by the target streamer ID registered in the rewards gift DB 366 by referring to the rewards gift DB 366 and the stream DB 314 at periodic or fixed time intervals. The DB update unit 354 measures the viewing time of the viewers for each of the identified livestreams and updates the viewing time of each viewer for the corresponding entry in the rewards gift DB 366. At the same time, the DB update unit 354 updates the total viewing time of the lottery history DB 370. When the total viewing time exceeds a predetermined value, for example 10 minutes, as a result of the update, the DB update unit 354 deletes that entry from the lottery history DB 370.

When the gift identified by the gift ID included in the gift specifying signal is the lottery gift, the winning probability calculating unit 356 calculates the winning probability by referring to the rewards gift DB 366 and the winning probability DB 368. The winning probability calculating unit 356 refers to the winning probability DB 368, and identifies parameters required for the formula for calculating the winning probability and calculation thereof (parameters such as viewing time and the lottery frequency) for the rewards gift corresponding to the lottery gift. The winning probability calculating unit 356 refers to an entry in which the streamer ID included in the gift specifying signal in the rewards gift DB 366 is the target streamer ID, and acquires the values of the identified parameters. For example, when the viewing time is identified as a parameter, the winning probability calculating unit 356 refers to the entry in which the streamer ID included in the gift specifying signal in the rewards gift DB 366 is the target streamer ID, and acquires the viewing time of the viewer identified by the viewer ID included in the gift specifying signal. In such a case, the viewing time for which the viewer who has used the lottery gift in the livestreaming of the streamer within the rewards time period has watched the livestreaming of the corresponding streamer during the rewards gift period is acquired. The winning probability calculating unit 356 calculates the winning probability by using the acquired parameter values and the identified formula.

The lottery unit 358 performs the lottery processing by using the winning probability calculated by the winning probability calculating unit 356. Because the technology used for performing the lottery according to a predetermined probability is a common knowledge, it is not explained in the present specification. When the lottery processing results in a loss, the lottery unit 358 transmits a lottery loss notification to the user terminal from which the gift specifying signal was sent. The lottery unit 358 includes the updated value of the accumulated points in the lottery loss notification.

The deposit condition determining unit 360 controls the use of the lottery gift by the viewer in accordance with the deposit condition. Upon receiving a request for determining usage availability from the user terminal 30 of the viewer, the deposit condition determining unit 360 determines whether to allow the use of the lottery gift according to the deposit condition related to the viewing time. In the present embodiment, viewing time-based recovery is used as the deposit condition. Under such a deposit condition, when the viewer uses the lottery gift, the viewer must view the target streamer's livestreaming for a predetermined time period, for example 10 minutes, until the next lottery gift becomes available.

The deposit condition determining unit 360 refers to the lottery history unit DB 370, and detects presence of an entry that corresponds to the viewer ID and the streamer ID included in the request for determining use availability. When no applicable entry exists, the deposit condition determining unit 360 generates a permission signal that allows use of the lottery gift. The deposit condition determining unit 360 transmits the generated permission signal via network NW to the user terminal 30 from which the request for determining use availability was sent. When an applicable entry is found, the deposit condition determining unit 360 compares that entry's total viewing time with the reference value, for example, 10 minutes. When the total viewing time exceeds the reference value, the deposit condition determining unit 360 transmits the permission signal via the network NW to the user terminal 30 from which the request for determining use availability was sent. At the same time, the deposit condition determining unit 360 deletes that entry from the lottery history DB 370. When the total viewing time is less than or equal to the reference value, the deposit condition determining unit 360 generates a permission denied signal that indicates that the use of the lottery gift is not allowed, and transmits that signal to the user terminal 30.

When the rewards gift period for a streamer expires, the deposit condition determining unit 360 deletes the entry that includes the streamer ID of the corresponding streamer from the lottery history DB 370.

The deposit condition can be any of the following instead of or in addition to the viewing time-based recovery.

(1) Only once during the rewards gift period
   The viewer can only use the lottery gift once during the target streamer's rewards gift period.
(2) Only once during the livestreaming
   The viewer can only use the lottery gift once in a livestreaming during the target streamer's rewards gift period. This is reset when the livestreaming expires, and the lottery gift can only be used once again in the next livestreaming during the rewards gift period.
(3) Upper limit on lottery frequency
   An upper limit is set on the number of lottery gifts that can be used during the target streamer's rewards gift period.

When the lottery processing result in the lottery unit 358 is a win, the distribution executing unit 362 performs the processing for distributing the accumulated points associated with the corresponding rewards gift to the viewer. The distribution executing unit 362 determines the points to be distributed. For example, the distribution executing unit 362 determines the accumulated points at the time of the win as the points to be distributed.

The distribution executing unit 362 determines an amount of points to be distributed to each viewer to whom the distribution is to be made. The distribution executing unit 362 determines the amount of the points to be distributed to the corresponding viewer such that the most points are distributed to the viewer who used the lottery gift related to the win. The distribution executing unit 362 acquires the lottery frequency of each viewer from the entry of the rewards gift of the rewards gift DB 366 related to win. The distribution executing unit 362 determines the amount of the points to be distributed to the corresponding viewer so that the amount of the distributed points is larger than the total of the equivalent value points paid out by each of the viewers to use the lottery gift. For example, when there are 7,000 points to be distributed. The viewer A used two lottery gifts worth 1,000 equivalent value points, and wins on the second try. The viewer B used one lottery gift. The distribution executing unit 362 determines that the number of points to be distributed to the viewer A is 4,000 while the amount to be distributed to the viewer B is 1,500.

The distribution executing unit 362 updates the user DB 316 so that the amount of points to be distributed determined as explained above is added to the points of each viewer. The distribution executing unit 362 deletes the entry of the rewards gift for which distribution has been completed from rewards gift DB 366. Accordingly, the rewards gift period corresponding to the deleted entry expires.

Figure 27:
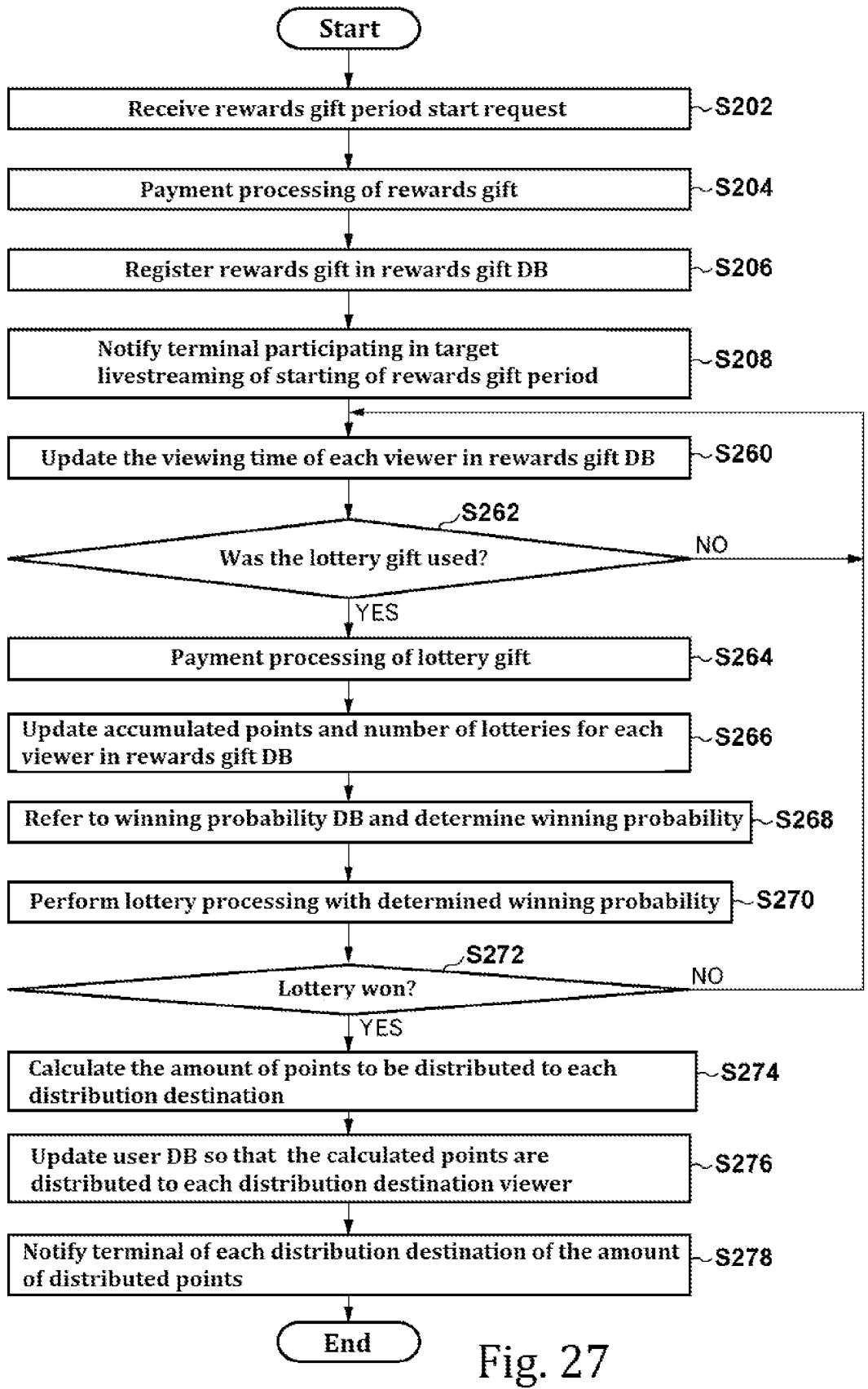
FIG. 27 is a flowchart showing a sequence of processes performed in the livestreaming system according to the second embodiment.

Operation of livestreaming system according to the present embodiment is explained below. FIG. 27 is a flowchart showing a sequence of processes performed in the livestreaming system according to the second embodiment. The server 50 updates the viewing time of each viewer for which entry was added to rewards gift DB 366 at Step S206 (Step S260). The server 50 determines whether the lottery gift is used during the livestreaming of the streamer identified by the target streamer ID included in the entry added to rewards gift DB 366 at Step S206 (Step S262). When the lottery gift is not used (N at Step S262), the process returns to Step S260. If the lottery gift is used (Y at Step S262), the server 50 performs payment processing for the lottery gift (Step S264), and updates the lottery frequency and the accumulated points for each viewer of the entry added to the rewards gift DB 366 at Step S206 (Step S266). The server 50 refers to the winning probability DB 368 to determine the winning probability (Step S268). The server 50 performs the lottery processing by using the winning probability determined at Step S268 (Step S270). When the lottery does not result in a win, (N at Step S272), the processing returns to Step S260. When the lottery results in a win (Y at Step S272), the server 50 calculates the amount of points to be distributed to each distribution destination (Step S274). The server 50 updates the user DB 316 such that the amount of points calculated at Step S274 is distributed to the distribution destination viewers (Step S276). The server 50 send a notification that includes the distributed points to the user terminal 30 of each distribution destination (Step S278).

Figure 28:
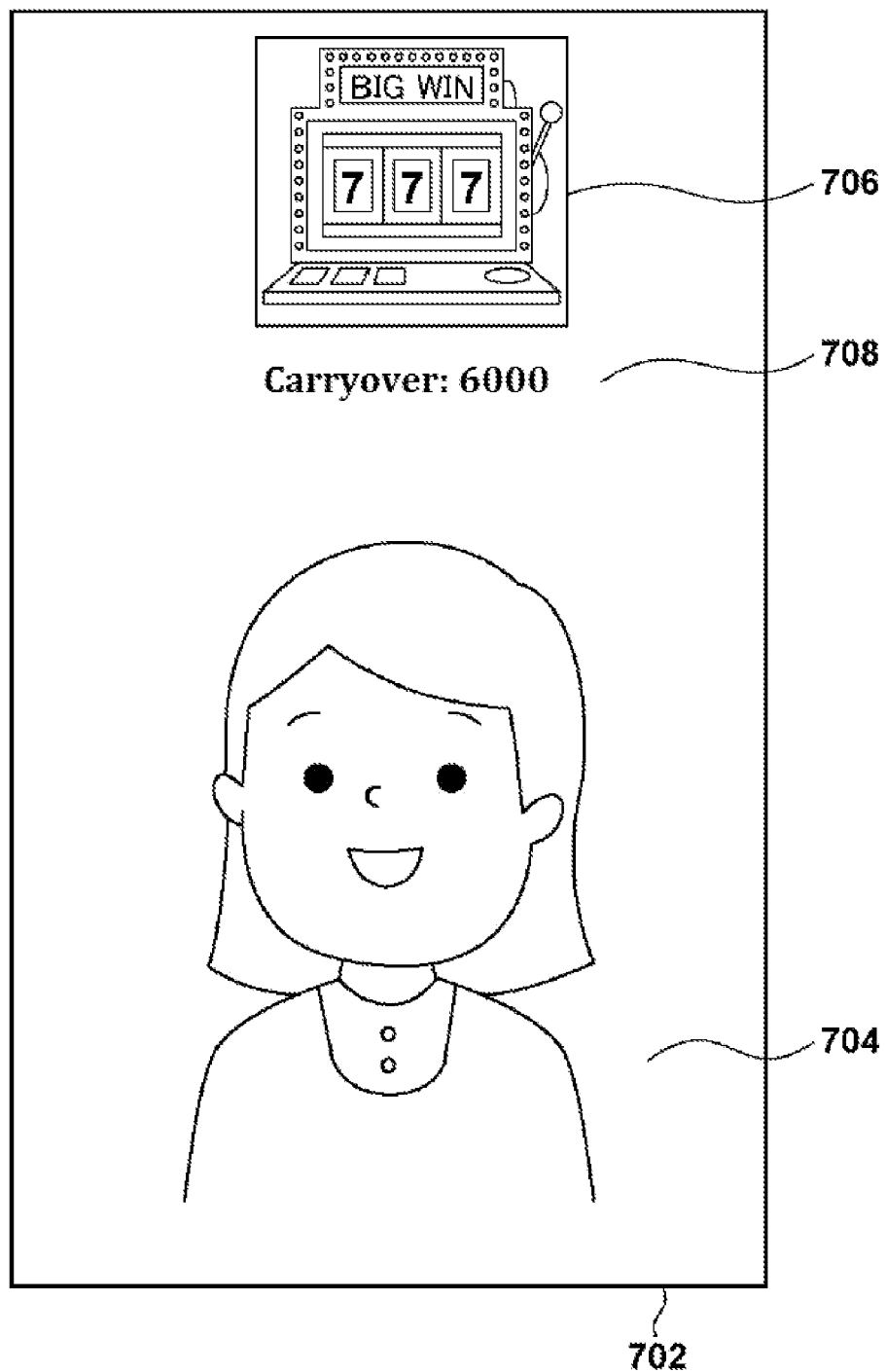
FIG. 28 is an exemplary screen diagram showing the livestreaming room screen displayed on the display section of the user terminal of the viewer.

FIG. 28 is an exemplary screen diagram showing the livestreaming room screen 702 displayed on the display section of the user terminal 30 of the viewer. The livestreaming room screen 702 shown in FIG. 28 corresponds to the livestreaming during the rewards gift period, and is therefore configured to be able to receive the lottery gift instruction. The livestreaming room screen 702 includes a streamer image 704 obtained by playing the video data received from the server 50, a lottery target object 706 that corresponds to the used rewards gift, and an accumulated points display area 708 that indicates the accumulated points at that point.

While receiving and playing the video data related to the livestreaming (for example, while the viewer is viewing the livestreaming), the viewing unit 200 periodically or at predetermined time intervals generates a request for determining use availability so as to determine whether the lottery gift can be used, and transmits the same to the server 50 via the network NW. The request for determining use availability includes the streamer ID of the streamer within the rewards gift period and the viewer ID of the viewer that are watching the corresponding streamer's livestreaming.

Upon receiving the request for determining the use availability, the rewards gift processing unit 350 refers to the rewards gift DB 366, and acquires the accumulated points of the entry for which the streamer ID included in the request for determining the use availability is the target streamer ID. The rewards gift processing unit 350 adds the acquired accumulated points to the permission signal or the permission denied signal sent by the deposit condition determining unit 360 according to the signal of determined use availability. Upon receiving the permission signal, the superimposed information generating unit 204 displays the lottery target object 706 in a selectable state. Upon receiving the permission denied signal, the superimposed information generating unit 204 displays the lottery target object 706 in a non-selectable state, for example, in a grayed-out state. The superimposed information generating unit 204 updates the display contents of the accumulated points display area 708 in accordance with the accumulated points included in the received permission signal or the permission denied signal.

When the viewer taps the lottery target object 706 displayed as selectable on the livestreaming room screen 702 shown in FIG. 28, the viewing-side UI control unit 202 displays the lottery gift selection screen 710 on the display section.

Figure 29:
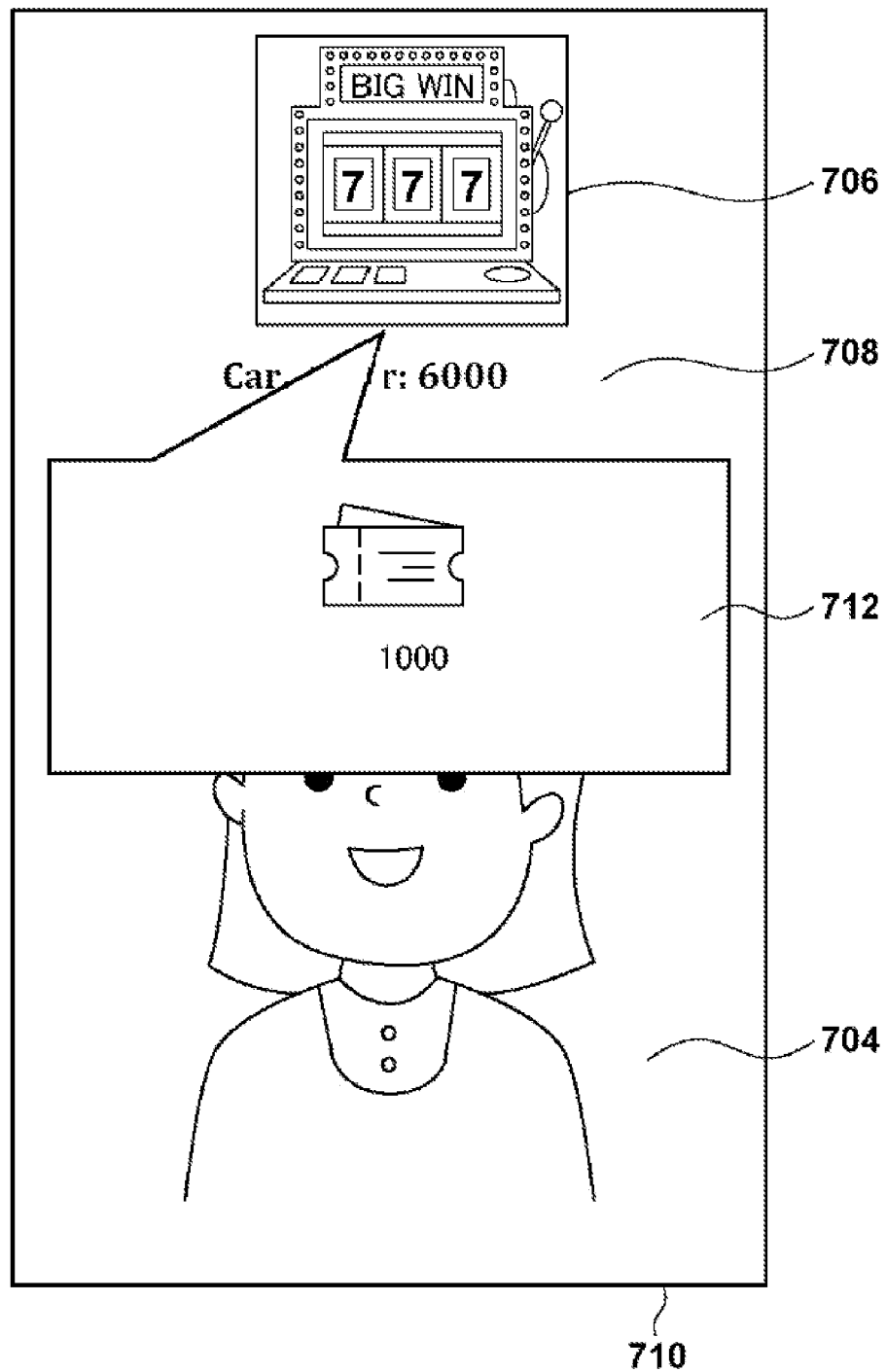
FIG. 29 is an exemplary screen diagram showing a lottery gift selection screen on the display section of the user terminal of the viewer.

FIG. 29 is an exemplary screen diagram showing a lottery gift selection screen 710 on the display section of the user terminal 30 of the viewer. The lottery gift selection screen 710 is a screen on which the lottery gift selection pop-up 712 is superimposed on the livestreaming room screen 702 shown in FIG. 28. The lottery gift selection pop-up 712 includes the lottery gift object of the lottery gift corresponding to the rewards gift used for the target streamer.

The viewer taps the lottery gift object. When viewing-side UI control unit 202 receives the lottery gift instruction, that is, the lottery gift object instruction from the viewer, the input information transmission unit 206 generates a gift specifying signal that includes the lottery gift ID of the specified lottery gift, the viewer ID of the viewer, and the streamer ID of the streamer, and transmits the signal to the server 50 via the network NW. The processing performed on the server 50 after receiving the gift specifying signal is as described above. Upon receiving the lottery loss notification, the viewing-side UI control unit 202 displays on the display section the lottery loss notification screen 714. Upon receiving the lottery win notification, the viewing-side UI control unit 202 displays on the display section the lottery win notification screen 720.

Figure 30:
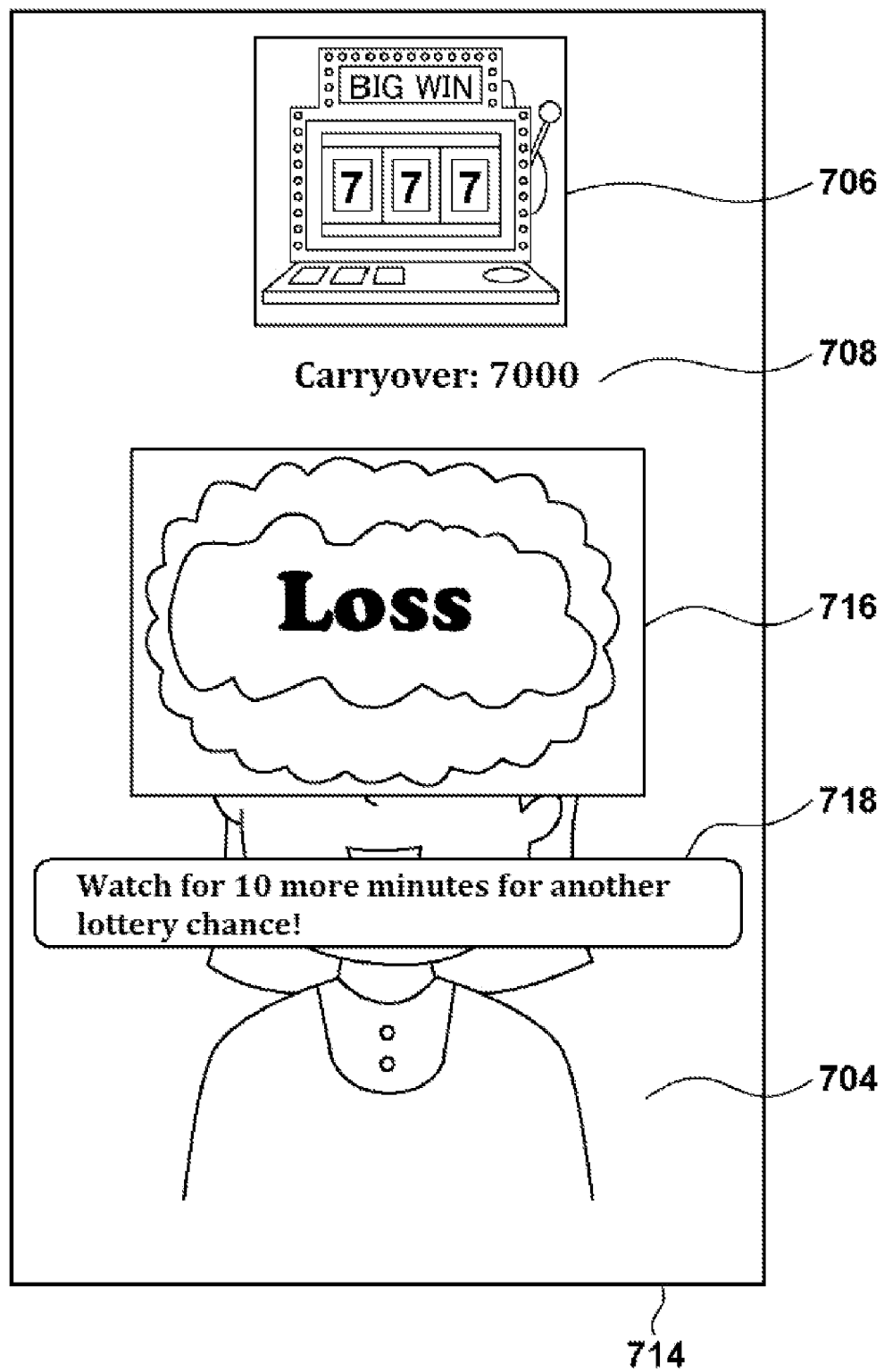
FIG. 30 is an exemplary screen diagram showing a lottery loss notification screen on the display section of the user terminal of the viewer.

FIG. 30 is an exemplary screen diagram showing a lottery loss notification screen 714 on the display section of the user terminal 30 of the viewer. The lottery loss notification screen 714 is a screen on which a lottery loss mark 716 and a message 718 are displayed on livestreaming room screen 702 shown in FIG. 28. The display contents of the accumulated points display area 708 is updated according to the updated accumulated points value included in the lottery loss notification. The message 718 is a message related to the deposit conditions related to the viewing time, and displays that the lottery gift can be used again after a predetermined time period has passed.

Figure 31:
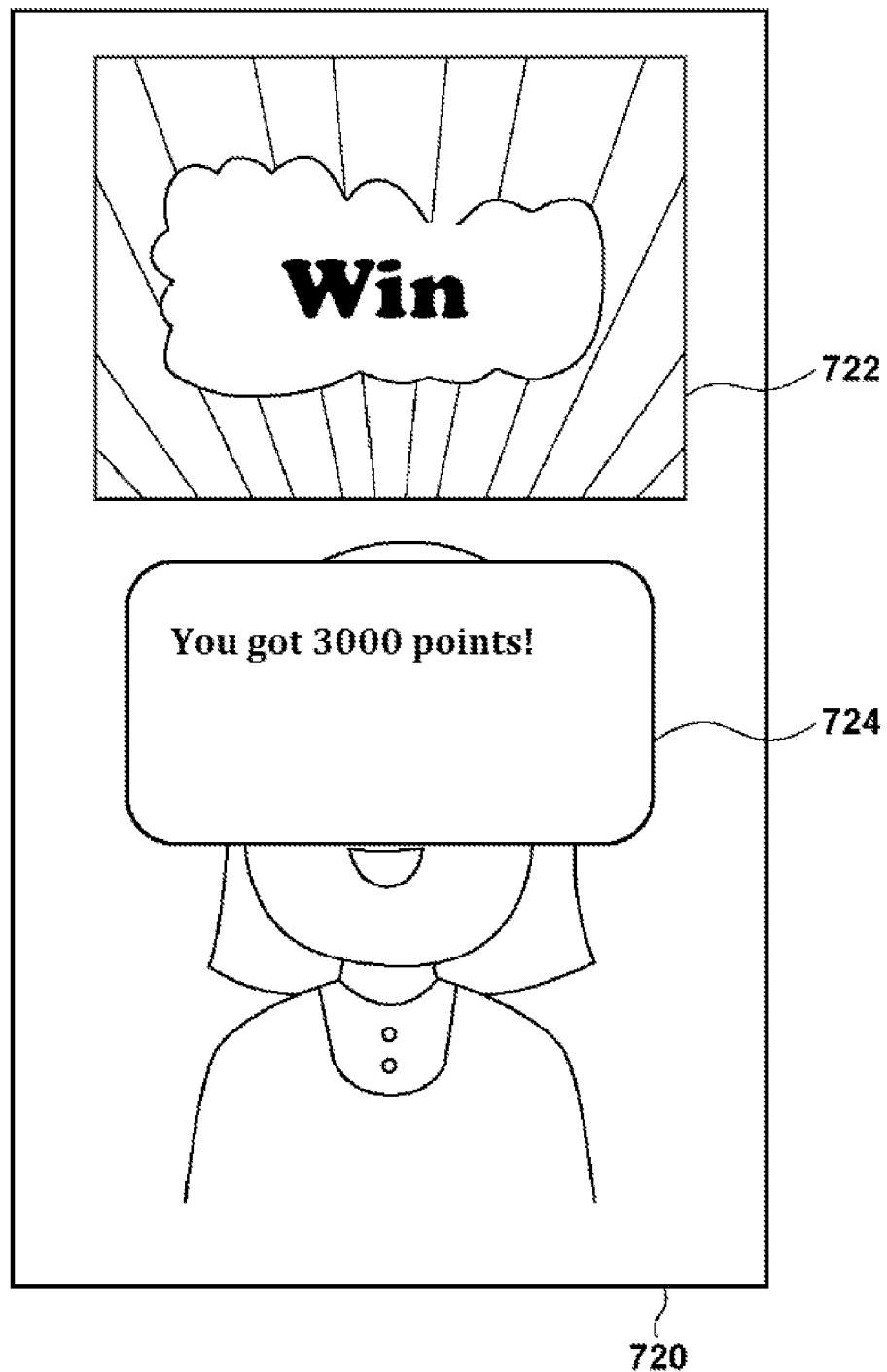
FIG. 31 is an exemplary screen diagram showing a lottery win notification screen on the display section of the user terminal of the viewer.

FIG. 31 is an exemplary screen diagram showing a lottery win notification screen 720 on the display section of the user terminal 30 of the viewer. The lottery win notification screen 720 is a screen on which a lottery win mark 722 and a message 724 are displayed on livestreaming room screen 702 shown in FIG. 28. The message 724 displays the amount of points distributed to the viewer.

According to the livestreaming system according to the present embodiment, the same effect as that demonstrated by the livestreaming system 1 according to the first embodiment can be demonstrated.

In the present embodiment, it is explained that the points are distributed to other viewers who used the lottery gift in addition to the winner; however, the configuration is not limited thereto, and for example, all points shown in the accumulated points can be awarded to the winning viewer only.

Hardware Configuration

Figure 32:
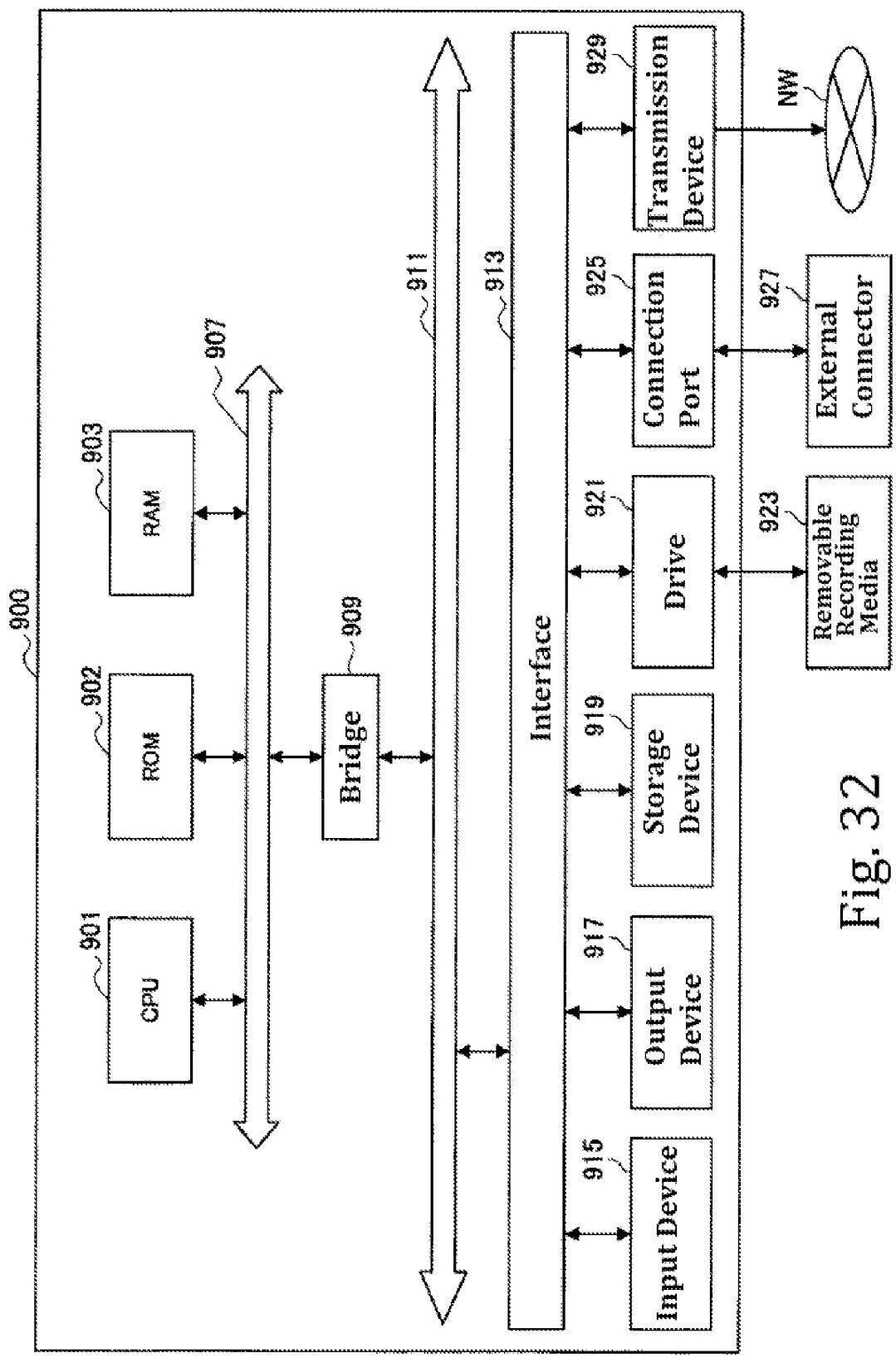
FIG. 32 is a block diagram showing an example of a hardware configuration of an information processing device according to an embodiment.

Hardware configuration of the information processing device related to first embodiment and the second embodiment will be explained below with reference to FIG. 32. FIG. 32 is a block diagram showing an example of a hardware configuration of an information processing device according to these embodiments. An information processing device 900 shown in the figure can realize the server 10, the user terminal 20 or 30 according to the first embodiment, and the server 50 according to the second embodiment.

The information processing device 900 includes a CPU 901, a ROM (read-only memory) 903, and a RAM (random access memory) 905. Moreover, the information processing device 900 can include a host bus 907, a bridge 909, an external bus 911, an interface 913, an input device 915, an output device 917, a storage device 919, a drive 921, a connection port 925, and a communication device 929. Furthermore, the information processing device 900 includes a not-shown imaging device such as a camera. The information processing device 900 can include a DSP (Digital Signal Processor) or a processing circuit known as an ASIC (Application Specific Integrated Circuit) instead of the CPU 901.

The CPU 901 functions as an operation processing device and a control device, and controls all or part of the operations of information processing device 900 in accordance with various types of computer programs recorded on the ROM 903, the RAM 905, the storage device 919, or the removable recording media 923. For example, the CPU 901 controls all operations of various function units included in the server 10 and user terminals 20 and 30 according to the present embodiment. The ROM 903 records a computer program, an operation parameter, and the like used by the CPU 901. The RAM 905 primarily stores for the computer programs used in the operations performed by the CPU 901 as well as the parameters that are appropriately changed in its operation. The CPU 901, the ROM 903, and the RAM 905 are connected to each other via the host bus 907 configured by internal buses such as the CPU bus. Furthermore, the host bus 907 is connected to the external bus 911 via the bridge 909 such as a PCI (Peripheral Component Interconnect/Interface) bus.

The input device 915 can be a device that is operated by a user, such as a mouse, keyboard, touch panel, button, switch, lever, etc., or it could be a device that converts physical quantities like microphone or other sound sensors, acceleration sensor, tilt sensor, infrared sensor, depth sensor, temperature sensor and humidity sensor to an electric signal. The input device 915 can be, for example, a remote control device that uses infrared light and other radio waves, or can be an external connector 927 such as a mobile phone that corresponds to an operation of the information processing device 900. The input device 915 generates an input signal based on the information input by the user or detected physical quantities, and includes an input control circuit that outputs the signal to the CPU 901. The user inputs various data in the information processing device 900 or provides an instruction for processing operations by controlling the input device 915.

The output device 917 is configured as a device that is capable of notifying the user of the acquired information visually or audibly. The output device 917 can be a display section such as LCD, PDP or OELD, an audio output device such as speakers or headphones, or a printer device. Output device 917 can output results obtained from information processing device 900 processing, visually such as text or an image, and audibly, such as sound.

The storage device 919 is a device for storing data configured as an example of the storing unit of the information processing device 900. The storage device 919 is configured to be, for example, a magnetic storage device such as an HDD (hard disk drive), a semiconductor storage device, an optical storage device, or a magneto-optical storage device. The storage device 919 stores a computer program and various data executed by the CPU 901 and various data acquired from the external unit.

The drive 921 is a reader/writer for removable recording media 923 such as a magnetic disk, optical disk, magneto-optical disk or semiconductor memory, and is built into or attached externally to the information processing device 900. The drive 921 reads information recorded in the installed removable recording media 923, and outputs it to the RAM 905. Moreover, the drive 921 writes the records in the installed removable recording media 923.

The connection port 925 is a port for directly connecting equipment to the information processing device 900. The connection port 925 is a port for USB (Universal Serial Bus, IEEE 1394 port, SCSI Small Computer System Interface) port, and the like. The connection port 925 can be a port for RS-232 c-port, optical audio terminal, HDMI (registered trademark/High-Definition Multimedia Interface), and the like. Various data can be exchanged between the information processing device 900 and the external connector 927 by connecting the external connector 927 to the connection port 925.

The communication device 929 is a communication interface configured, for example, as a communication device for connecting to the network NW. The communication device 929 can be a communication card for, for example, a wired or wireless LAN (Local Area Network), Bluetooth (registered trademark) or WUSB (Wireless USB). The communication device 929 can be a router for optical transmission, an ADSL (Asymmetric Digital Subscriber Line) router, or various communication modems. The communication device 929 transmits and receives a signal between, for example, the Internet and other communication devices by using a predetermined protocol such as TCP/IP. The communication network NW connected to the communication device 929 is a network connected by using wires or wirelessly, and can be Internet, in-home LAN, infrared communication, radio wave transmission, or satellite communication. Furthermore, the communication device 929 realizes the function of a communication unit.

The not-shown imaging device such as camera, for example, is a device that takes an image of a real space by using various types of members such as lens for controlling an image element and the image formation of the subject image on the image sensor n image sensor elements and generate captured images such as CCD (Charge Coupled Device) or CMOS (Complementary Metal Oxide Semiconductor). Such an imaging device can be a device that captures still images, or a device that captures video images.

In the above explanation, the configuration and the operation of the livestreaming system according to the embodiments are explained. The embodiments are exemplary, and a person skilled in the art can understand that various modifications are possible by combining various components and processes, and such modifications are also within the scope of the present disclosure.

In the first embodiment and the second embodiment, the points added to the accumulated points when the deposit gift or lottery gift is used can be set according to administrator's preferences. For example, the administrator's preference can be set such that the longer the viewing time of the viewer who has used such gifts and/or the more frequent the deposits/lotteries, the more points are added to the accumulated points. Alternatively, the added points can be changed at random.

In the first embodiment, a configuration in which an instruction to start distribution is received from the target streamer is explained; however, the present invention is not limited thereto. For example, it can be configured such that the instruction to start distribution can be received from the rewards gift giving viewer, or it can be configured such that once the distribution condition is satisfied, distribution is automatically executed.

In the first embodiment, the distribution condition can include at least one of the following: after a certain time period has passed, the number of viewers exceed the reference value, the viewing time exceeds the reference value, and total streaming time exceeds the reference value during the rewards gift period.

In the first embodiment, a configuration in which the distribution destination specifying unit 336 determines whether the receipt condition is satisfied for each viewer registered in the "viewing time of each viewer" entry of the rewards gift DB 320 is explained; however, the present invention is not limited thereto, and for example, the distribution destination identifying unit 336 can determine whether the receipt condition is satisfied for a viewer who is watching the livestreaming when the distribution condition is satisfied or when the streamer inputs the instruction to start distribution. In such a configuration, the users who gave the deposit gift but did not watch the livestreaming at the time of satisfying the distribution condition is excluded from the distribution destination. Therefore, because even the viewer who cleared the viewing time condition is motivated to continue watching the livestreaming until the distribution starts to receive rewards, the viewing time can be increased and the merit of the livestreaming can be easily conveyed.

In the first embodiment and the second embodiment, a configuration in which the default value is contributed to the accumulated points as contribution portion of the rewards gift is explained; however, the present invention is not limited thereto. For example, the points corresponding to the equivalent value of the rewards gift can be added to the accumulated points when the distribution condition is satisfied, or the accumulated points can be increased by a factor corresponding to the equivalent value of the rewards gift at the time of the win.

In the first embodiment and the second embodiment, a configuration in which the distribution destination viewer is selected from viewers who have used the deposit gifts or lottery gifts is explained; however, the present invention is not limited thereto. For example, it can be configured to also distribute points to viewers who have not used the deposit gift. In such a configuration, it can be set up such that the amount of points distributed to such a viewer is less than the amount of points distributed to the viewer who has used the deposit gift. In such a configuration, the viewer enticement effect increases by setting up the rewards gift. Alternatively, it can be configured so as to distribute the points to the streamer as well. Alternatively, it can be configured so as to distribute points to the viewer who has used the normal gift during the livestreaming of the target streamer as well.

In the first embodiment and the second embodiment, the viewing time during the rewards gift period is used as the viewing time; however, the present invention is not limited thereto, and for example, the viewing time for the month in which a reward gift is used can be used. Alternatively, a longer predetermined time period (for example, the past one year) that is different from the rewards gift period can be set and used as the viewing time during the predetermined time period can be used as the viewing time.

The rate of conversion from the equivalent value points of the gift to the awarded points according to the first embodiment and the second embodiment is just an example; however, the present invention is not limited thereto, and for example, the rate of conversion can be set appropriately by the administrator of the livestreaming system.

In the first embodiment, a configuration in which the intended deposit gift is selected from three types of deposit gifts with differing equivalent values is explained; however, the present invention is not limited thereto, and for example, it can also be configured so that the equivalent value of the deposit gift can be specified according to the viewer's preference.

In the first embodiment, a configuration in which the accumulated points condition that uses the reference value of the accumulated points is included in the distribution condition; however, the present invention is not limited thereto, and for example, a parameter other than the accumulated points can also be set. For example, a health gauge bar that includes the reference value of the accumulated points as the default value can be set up. In such a configuration, each time the deposit gift is used, the gauge bar decreases. The distribution condition includes a health bar gauge condition that is satisfied when the health bar gauge reaches 0. Alternatively, the distribution condition can only include the viewed time condition. In such a configuration, regardless of the accumulated points, the distribution condition is satisfied once the total viewed time reaches the reference value.

In the first embodiment and the second embodiment, the reward rate of the points can be adjusted according to the target streamer's level (a parameter that increases as the activity of the target streamer on the livestreaming platform increases) or the number of followers. For example, it can the lower the level, the higher the reward rate, or can the lower the number of followers, the higher the reward rate. In such a configuration, the rewards to the new streamer can be enhanced. The amount of points distributed to the viewers who have newly followed a streamer having the fewer followers than a predetermined number during the rewards gift period can be set higher. In such a configuration, rewards to the new fans of the new streamer can be enhanced.

The technical ideas according to the first embodiment and the second embodiment can be applied to virtual livestreaming or live commerce that uses avatars that move in synchronization with the streamer instead of using an actual image of the streamer.

In the processing steps explained in the present specification, especially the processing steps described by using flow diagrams and flowcharts, there is a possibility that a part of the process (steps) included in the that processing is omitted, that a certain process not disclosed as a process that is included in that processing is added, and/or the sequence of the steps of the processing is rearranged, and as long as it specifically does not deviate from the purpose of the present disclosure, such omission, addition and rearrangement of the sequence of processing step is included in the scope of the present disclosure.

At least a part of the functions realized by the server can be realized by a device other than the server, for example, by a user terminal. At least a part of the functions realized by the user terminal can be realized by a device other than the user terminal, for example, by a server. For example, the superimposition of a predetermined frame image on the video data image performed in the playback side user terminal can be performed on a server or on a generation side user terminal.

What is claimed is:

1. A server, comprising:
and
a receiving unit that receives, from a terminal of a streamer of a livestreaming via a network, a start request that includes data indicating a reward amount of electronic value specified by the streamer;
a starting unit that starts a time period upon receiving the start request;
a payment unit that processes a payment of the reward amount of electronic value by the streamer upon receiving the start request;
a distribution unit that enables, when the time period has expired, distribution of the electronic value of the reward amount to a plurality of viewers who are watching the livestreaming of the streamer at the time when the time period has expired, the payment of the reward amount of electronic value being made by the streamer.

2. A method comprising:
receiving, from a terminal of a streamer of a livestreaming via a network, a start request that includes data indicating a reward amount of electronic value specified by the streamer;
starting a time period upon receiving the start request;
processing a payment of the reward amount of electronic value by the streamer upon receiving the start request; and
enabling, when the time period has expired, distribution of the electronic value of the reward amount to at least one viewer who is watching the livestreaming of the streamer at the time when the time period has expired, the payment of the reward amount of electronic value being made by the streamer.

3. The server as claimed in claim 1, wherein the distribution unit does not enable the distribution to a user who is not watching the livestreaming of the streamer at the time when the time period has expired.

4. The server as claimed in claim 1, wherein a viewer that satisfies a condition related to commenting in the livestreaming of the streamer is identified as a distribution destination viewer for the electronic value of the reward amount.

5. The server as claimed in claim 1, wherein a viewer that satisfies a condition related to membership of a fan club of the streamer is identified as a distribution destination viewer for the electronic value of the reward amount.

6. The server as claimed in claim 1, wherein a viewer that satisfies a condition related to sharing of the livestreaming of the streamer is identified as a distribution destination viewer for the electronic value of the reward amount.

7. The server as claimed in claim 1, further comprising:
a unit that causes, upon receiving the start request, a terminal of a viewer of the livestreaming of the streamer to start to display an object; and
a unit that registers the viewer who specifies the object as a candidate for a distribution destination viewer for the electronic value of the reward amount.

8. The server as claimed in claim 7, wherein the distribution unit selects the plurality of viewers from the registered viewers who specified the object during the time period.

* * * * *